(12) United States Patent
Cullen et al.

(10) Patent No.: US 12,148,185 B2
(45) Date of Patent: Nov. 19, 2024

(54) AUTOMATIC PARAMETER ADJUSTMENT FOR SCANNING EVENT CAMERAS

(71) Applicant: Summer Robotics, Inc., Campbell, CA (US)

(72) Inventors: Schuyler Alexander Cullen, Santa Clara, CA (US); Brian Alexander Paden, Scotts Valley, CA (US)

(73) Assignee: Summer Robotics, Inc., Campbell, CA (US)

( * ) Notice: Subject to any disclaimer, the term of this patent is extended or adjusted under 35 U.S.C. 154(b) by 341 days.

(21) Appl. No.: 17/865,794

(22) Filed: Jul. 15, 2022

(65) Prior Publication Data

US 2023/0015889 A1    Jan. 19, 2023

Related U.S. Application Data

(60) Provisional application No. 63/203,261, filed on Jul. 15, 2021.

(51) Int. Cl.
G06T 7/80    (2017.01)

(52) U.S. Cl.
CPC ...... *G06T 7/80* (2017.01); *G06T 2207/30241* (2013.01)

(58) Field of Classification Search
None
See application file for complete search history.

(56) References Cited

U.S. PATENT DOCUMENTS 9,117,267 B2    8/2015    Francis, Jr. et al.
9,489,735 B1   11/2016    Reitmayr
(Continued)

FOREIGN PATENT DOCUMENTS

CN    109458928 A    3/2019
CN    112365585 A    2/2021
(Continued)

OTHER PUBLICATIONS

International Search Report and Written Opinion for International Patent Application No. PCT/US2022/037299 mailed Oct. 25, 2022, pp. 1-7.
(Continued)

*Primary Examiner* — Raul J Rios Russo
*Assistant Examiner* — Carl F. R. Tchatchouang
(74) *Attorney, Agent, or Firm* — John W. Branch; Branch Partners PLLC

(57) ABSTRACT

Embodiments are directed to parameter adjustment for sensors. A calibration model and a calibration profile for a sensor may be provided. Calibration parameters associated with the sensor may be determined based on the calibration profile. The sensor may be configured to use a value of the calibration parameter based on the calibration profile. Trajectories may be generated based on a stream of events from the sensor. Metrics associated with the sensor events or the trajectories may be determined. If a metric value may be outside of a control range, further actions may be iteratively performed, including: modifying the value of the calibration parameter based on the calibration model; configuring the sensor to use the modified value of the calibration parameter; redetermining the metrics based on additional trajectories; if the metric is within a control range, the iteration may be terminated and the calibration profile may be updated.

32 Claims, 17 Drawing Sheets

(56) References Cited

U.S. PATENT DOCUMENTS

| | | | |
|---|---|---|---|
| 10,213,645 B1* | 2/2019 | Wu | A63B 24/0003 |
| 11,704,835 B2 | 7/2023 | Cullen et al. | |
| 11,785,200 B1 | 10/2023 | Smits et al. | |
| 2008/0012850 A1 | 1/2008 | Keating, III | |
| 2008/0165360 A1 | 7/2008 | Johnston | |
| 2008/0201101 A1 | 8/2008 | Hebert et al. | |
| 2009/0087029 A1* | 4/2009 | Coleman | G06V 10/255 382/103 |
| 2009/0096994 A1 | 4/2009 | Smits | |
| 2014/0368614 A1 | 12/2014 | Imai et al. | |
| 2015/0378023 A1 | 12/2015 | Royo Royo et al. | |
| 2016/0180574 A1 | 6/2016 | Kaminitz et al. | |
| 2016/0259168 A1 | 9/2016 | Katz et al. | |
| 2017/0035281 A1 | 2/2017 | Takeuchi et al. | |
| 2017/0068861 A1* | 3/2017 | Miller | G06V 20/52 |
| 2017/0176575 A1 | 6/2017 | Smits | |
| 2017/0195589 A1 | 7/2017 | Kovacovsky et al. | |
| 2019/0128665 A1 | 5/2019 | Harendt | |
| 2019/0213309 A1 | 7/2019 | Morestin et al. | |
| 2019/0279379 A1 | 9/2019 | Srinivasan et al. | |
| 2020/0075658 A1 | 3/2020 | Kato et al. | |
| 2020/0160012 A1 | 5/2020 | Nunnink et al. | |
| 2020/0280664 A1 | 9/2020 | Lee et al. | |
| 2021/0023714 A1 | 1/2021 | Zhang et al. | |
| 2021/0141094 A1 | 5/2021 | Russ et al. | |
| 2021/0304574 A1 | 9/2021 | Ramanathan et al. | |
| 2022/0156998 A1 | 5/2022 | Lee et al. | |
| 2022/0187461 A1 | 6/2022 | Cullen | |
| 2022/0287676 A1 | 9/2022 | Steines et al. | |
| 2023/0003549 A1 | 1/2023 | Paden | |
| 2023/0034733 A1 | 2/2023 | Cullen et al. | |
| 2023/0060421 A1 | 3/2023 | Cullen et al. | |
| 2023/0169683 A1 | 6/2023 | Paden et al. | |
| 2023/0230212 A1 | 7/2023 | Garcia et al. | |
| 2023/0274523 A1 | 8/2023 | Paden et al. | |
| 2023/0316657 A1 | 10/2023 | Smits et al. | |

FOREIGN PATENT DOCUMENTS

| | | | |
|---|---|---|---|
| CN | 112750168 A | 5/2021 | |
| CN | 113313710 A | 8/2021 | |
| CN | 116829902 A | 9/2023 | |
| EP | 4260006 A1 | 6/2022 | |
| JP | H06-94428 A | 4/1994 | |
| JP | 2009-243986 A | 10/2009 | |
| JP | 2018-195240 A | 12/2018 | |
| JP | 2020-52719 A | 4/2020 | |
| JP | 2020-64011 A | 4/2020 | |
| JP | 2020-106475 A | 7/2020 | |
| JP | 2021-167776 A | 10/2021 | |
| WO | 2018000037 A1 | 1/2018 | |
| WO | 2018125850 A1 | 7/2018 | |
| WO | 2019189381 A1 | 10/2019 | |
| WO | 2020080237 A1 | 4/2020 | |
| WO | 2021039022 A1 | 3/2021 | |
| WO | 2021140886 A1 | 7/2021 | |
| WO | 2022132828 A1 | 6/2022 | |
| WO | 2023/278868 A1 | 1/2023 | |
| WO | 2023/288067 A1 | 1/2023 | |
| WO | 2023/009755 A1 | 2/2023 | |
| WO | 2023/028226 A1 | 3/2023 | |
| WO | 2023/096873 A1 | 6/2023 | |
| WO | 2023/164064 A1 | 8/2023 | |
| WO | 2023/177692 A1 | 9/2023 | |
| WO | 2023/196225 A1 | 10/2023 | |

OTHER PUBLICATIONS

International Search Report and Written Opinion for International Patent Application No. PCT/US2021/063399 mailed Mar. 22, 2022, pp. 1-7.

International Search Report and Written Opinion for International Patent Application No. PCT/US2022/038724 mailed Nov. 1, 2022, pp. 1-7.

International Search Report and Written Opinion for International Patent Application No. PCT/US2022/041520 mailed Nov. 8, 2022, pp. 1-7.

Office Communication for U.S. Appl. No. 17/876,333 mailed Feb. 21, 2023, pp. 1-22.

Office Communication for U.S. Appl. No. 17/876,333 mailed Mar. 1, 2023, pp. 1-2.

International Search Report and Written Opinion for International Patent Application No. PCT/US2022/050626 mailed Mar. 7, 2023, pp. 1-8.

Office Communication for U.S. Appl. No. 18/121,486 mailed Aug. 16, 2023, pp. 1-2.

International Preliminary Report on Patentability for International Patent Application No. PCT/US2021/063399 mailed Jun. 29, 2023, pp. 1-5.

International Search Report and Written Opinion for International Patent Application No. PCT/US2023/017271 mailed Jul. 11, 2023, pp. 1-7.

Office Communication for U.S. Appl. No. 18/121,486 mailed Aug. 3, 2023, pp. 1-10.

International Search Report and Written Opinion for International Patent Application No. PCT/US2023/013718 mailed May 30, 2023, pp. 1-7.

Office Communication for U.S. Appl. No. 18/130,080 mailed Jun. 20, 2023, pp. 1-36.

Office Communication for U.S. Appl. No. 17/895,489 mailed Jul. 5, 2023, pp. 1-13.

International Search Report and Written Opinion for International Patent Application No. PCT/US2023/015227 mailed Jun. 27, 2023, pp. 1-7.

International Search Report and Written Opinion for International Patent Application No. PCT/US2022/036006 mailed Oct. 4, 2022, pp. 1-8.

Office Communication for U.S. Appl. No. 17/895,489 mailed Apr. 11, 2023, pp. 1-36.

Office Communication for U.S. Appl. No. 18/222,780 mailed Sep. 15, 2023, 10 Pages.

Office Communication for U.S. Appl. No. 18/225,833 mailed Sep. 15, 2023, 19 Pages.

Office Communication for U.S. Appl. No. 18/130,080 mailed Sep. 28, 2023, 43 Pages.

* cited by examiner

AUTOMATIC PARAMETER ADJUSTMENT FOR SCANNING EVENT CAMERAS

CROSS-REFERENCE TO RELATED APPLICATION

This application is a Utility patent application based on previously filed U.S. Provisional Patent Application U.S. Ser. No. 63/203,261 filed on Jul. 15, 2021, the benefit of the filing date of which is hereby claimed under 35 U.S.C. § 119(e) and the contents of which is further incorporated in entirety by reference.

TECHNICAL FIELD

The present invention relates generally to machine sensing or machine vision systems, and more particularly, but not exclusively, to automatic parameter adjustment for scanning event cameras.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by a machine vision applications, such as, robotic planning and control systems, these 2D or 3D data often need to be processed by machine vision algorithms implemented in software or hardware. In some cases, some machine vision systems may employ machine learning to determine properties or features of the world that may be salient in particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment. Sensors employed in machine learning system often require various parameters or characteristics to be calibrated. Such calibration may be directed to performance variation across sensors, environment conditions, different requirements for different applications, and so on. In some cases, calibration may be laborious or time consuming and often may require manual interventions. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
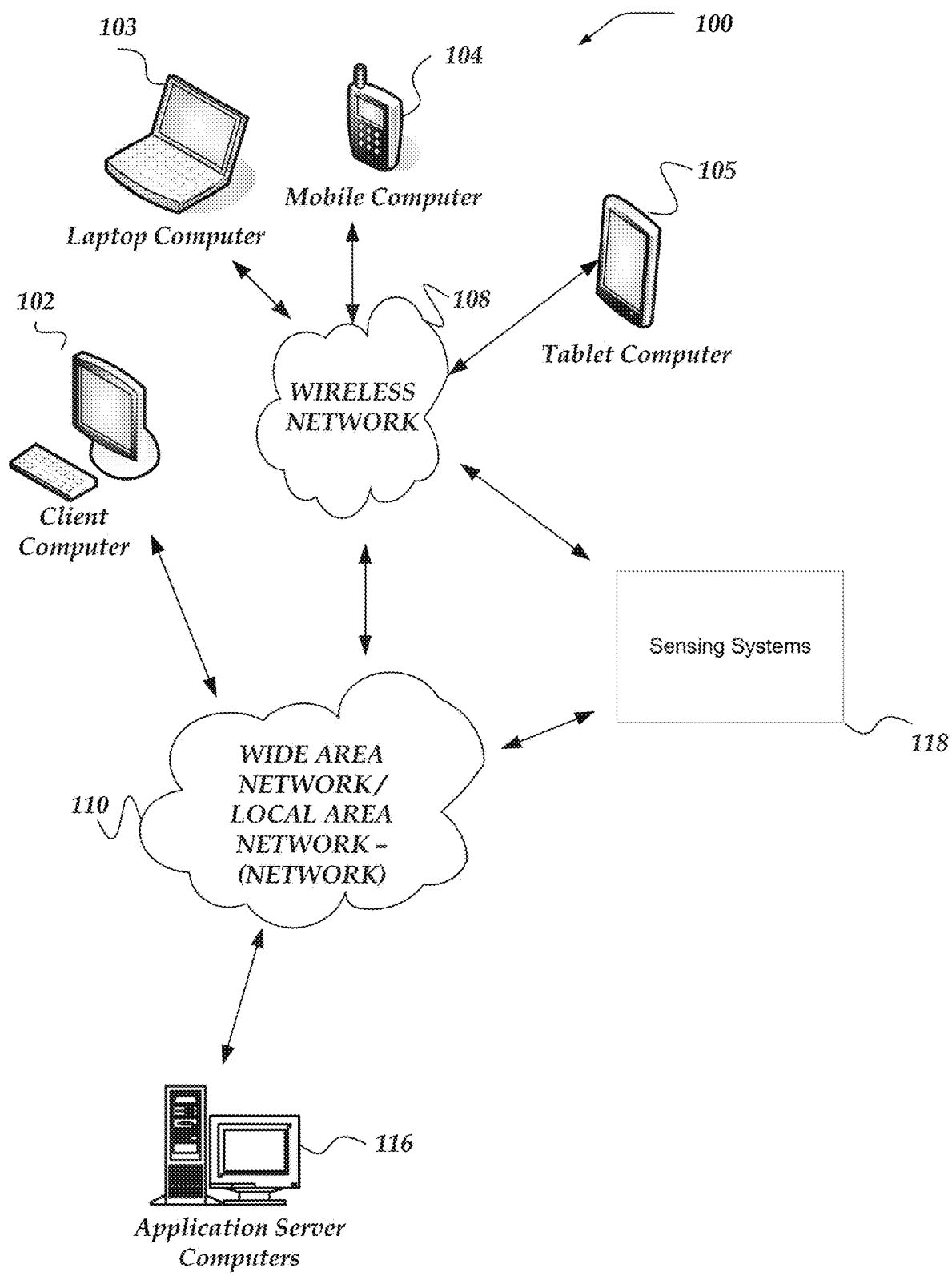
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "scanning signal generator" refers to a system or device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generator are not strictly limited to lasers or laser MEMS, other type of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan up to frequencies of 10s of kHz. The scanning signal generators may be controlled in a closed loop fashion with one or more processor that may provide feedback about objects in the environment and instructs the scanning signal generator to modify its amplitudes, frequencies, phase, or the like.

As used herein the term "sensor" refers to a device or system that can detect reflected energy from scanning signal generator. Sensors may be considered to comprise an array of detector cells that are responsive to energy reflected from scanning signal generators. Sensors may provide outputs that indicate which detector cells are triggered and the time they are triggered. Sensors may be considered to generate a sensor output that reports the cell location and time of detection for individual cell rather than being limited reporting the state or status of every cell. For example, sensors may include event sensor cameras, SPAD arrays, SiPM arrays, or the like.

As used herein the terms "trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to automatic parameter adjustment for scanning event cameras. In one or more of the various embodiments, a calibration model and a calibration profile for a sensor may be provided based on one or more characteristics of the sensor.

In one or more of the various embodiments, one or more calibration parameters associated with the sensor may be determined based on the calibration profile.

In one or more of the various embodiments, the sensor may be configured to use a value of the calibration parameter based on the calibration profile.

In one or more of the various embodiments, one or more trajectories may be generated based on a stream of events from the sensor such that each trajectory may be a parametric representation of a one-dimensional curve segment in a three-dimensional space.

In one or more of the various embodiments, one or more metrics associated with one or more of the sensor events or the one or more trajectories may be determined.

In one or more of the various embodiments, in response to determining a metric value that may indicate a calibration error, additional further actions may be iteratively performed, including: modifying the value of the calibration parameter based on the calibration model; configuring the sensor to use the modified value of the calibration parameter; redetermining the one or more metrics based on one or more additional trajectories based on another stream of events from the sensor; in response to determining that the metric value indicates a correct calibration, terminating the iteration and updating the calibration profile to store the modified value for the calibration parameter; or the like.

In one or more of the various embodiments, determining the one or more metrics may include: determining an average length of the one or more trajectories; in response to the average length of the one or more trajectories having a value that may be less than a threshold value, determining that the metric value may indicate the calibration error.

In one or more of the various embodiments, the one or more calibration parameters may include one or more parameters that may be intrinsic to the sensor, including one or more of a high-pass filter frequency, a low-pass filter frequency, a photodiode current gain, a voltage differential level for on-pixel level, a voltage differential level for off-pixel levels, or the like.

In one or more of the various embodiments, the one or more calibration parameters may include one or more parameters that may be extrinsic to the sensor, including one or more of scanning signal power, a scanning signal frequency, a pixel firing rate, a change in classification of noise or signal pixels, a path or a velocity of the scanning signal, a width of a laser spot from a laser, a camera bandpass filter for ambient light rejection, or the like.

In one or more of the various embodiments, determining the one or more metrics, may include: determining an event rate for the stream of events based on how fast the sensor generates one or more events and a scanning velocity of a scanning signal; in response to the even rate exceeding a threshold value, determining that the metric value may indicate a calibration error; or the like.

In one or more of the various embodiments, one or more other calibration profiles may be generated for the sensor based on one or more of an application, an operating environment, or a performance requirement. And, in some embodiments, the one or more other calibration profiles may be associated with the sensor based on one or more of the application, the operating environment, or the performance requirement.

In one or more of the various embodiments, a plurality of pixels included in the sensor may be determined based on the sensor. In one or more of the various embodiments, one or more portions of the plurality of pixels may be determined based on the calibration model. And, in some embodiments, one or more other calibration profiles may be generated such that each of the other calibration profiles may be associated with a separate portion of the plurality of pixels.

In one or more of the various embodiments, modifying the value of the calibration parameter may include: determining an adjustment value to modify the value of the calibration parameter based on employ a coordinate descent method; updating the value of the calibration parameter based on the determined adjustment value; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
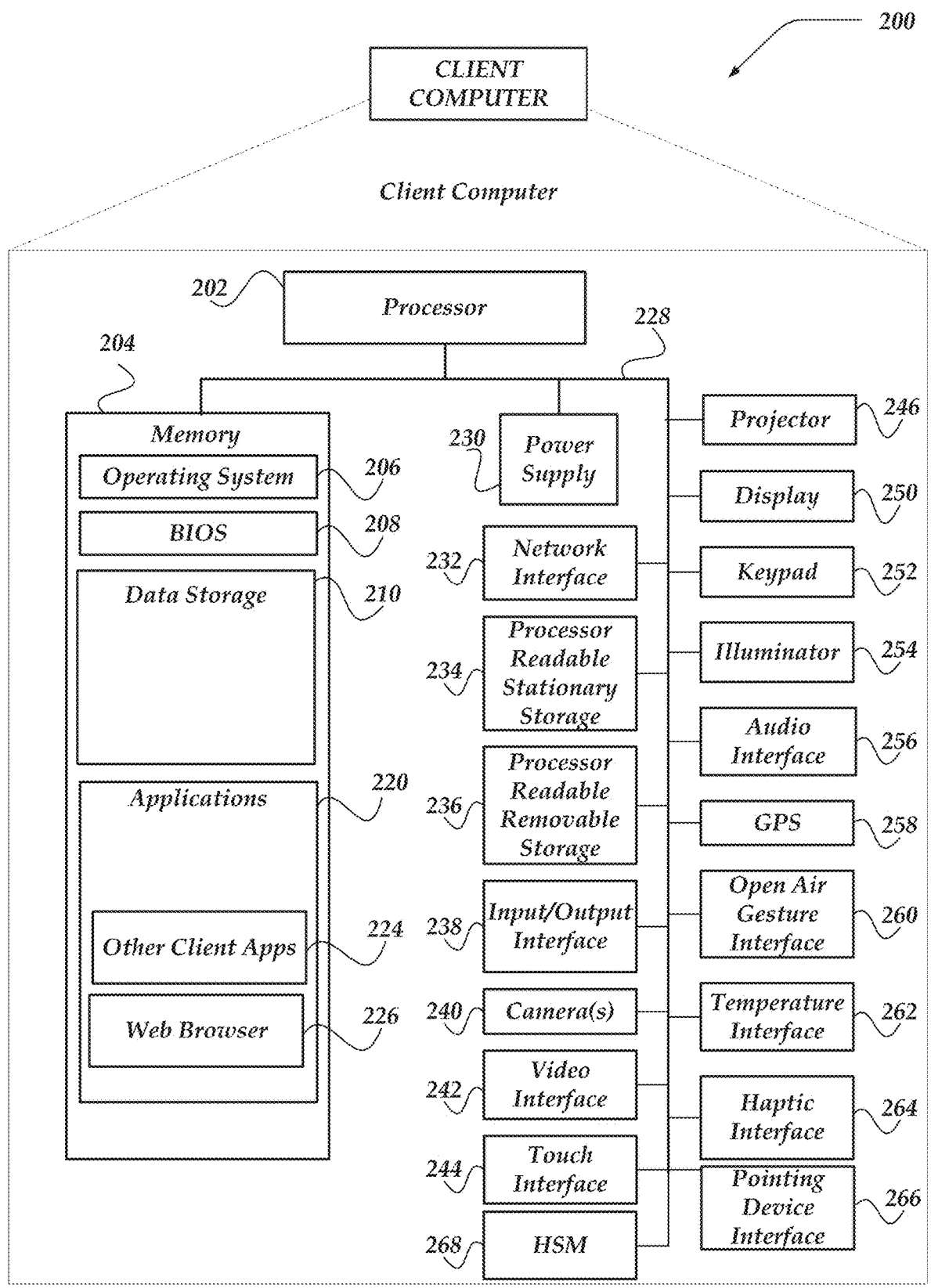
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
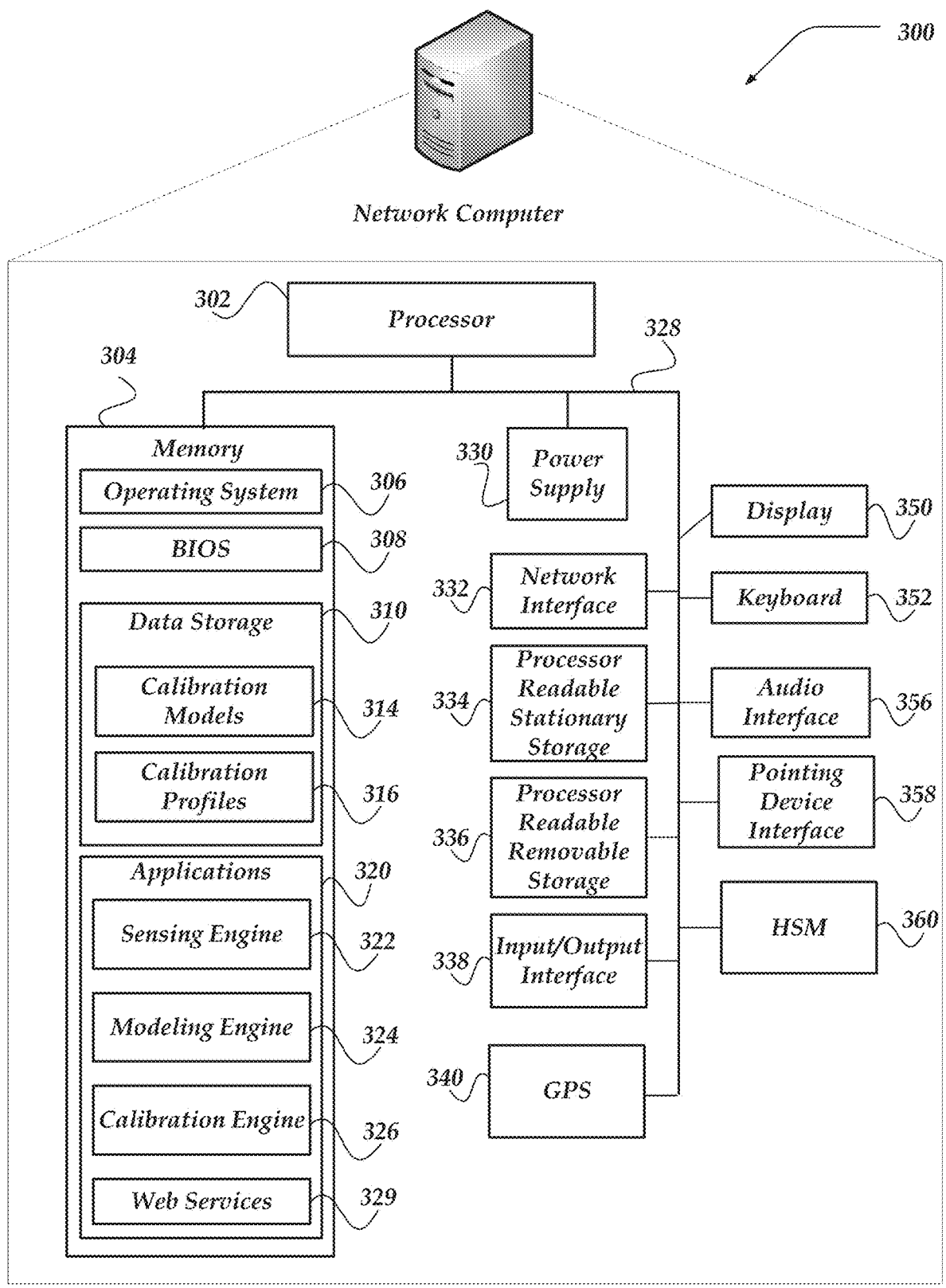
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
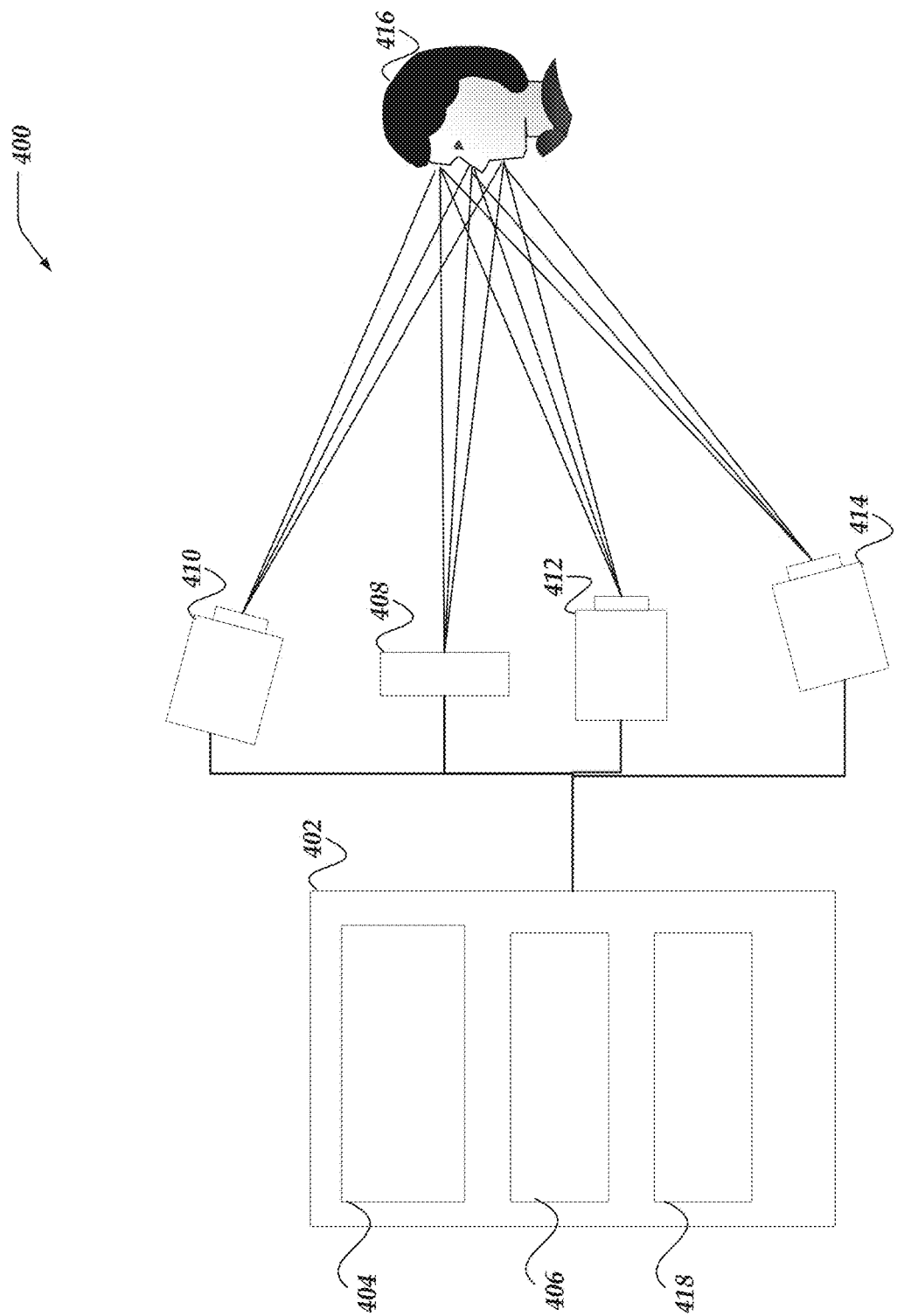
FIG. 4 illustrates a logical architecture of a system for automatic parameter adjustment for scanning event cameras in accordance with one or more of the various embodiments.

FIG. 4 illustrates a logical architecture of system 400 for automatic parameter adjustment for scanning event cameras in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more sensors that may receive the reflected signal energy. In this example, for some embodiments, the sensors may be considered sensors that may be arranged to generate sensor information that corresponds to the reflected signal energy. In this example, sensors, such as, sensor 410, sensor 412, sensor 414 may be considered to be CCDs, scanning event cameras, or the like, that provide two-dimensional (2D) sensor information based on the CCD/pixel cells that detect the reflected signal energy.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow a specific pattern based on one or more path-functions. Thus, in some embodiments, signal generators may scan the subject area using a known and precise path that may be defined or described using one or more function that correspond to the curve/path of the scanning.

Accordingly, in some embodiments, sensing engines may be arranged to synthesize information about the objects or surfaces scanned by the signal generate based on the 3D sensor information provided by the sensors and the known scanning curve pattern.

In some embodiments, scanning signal generator 408 may implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include two or more sensors, such as, sensor 410, sensor 412, sensor 414, or the like. In some embodiments, sensors may comprise arrays of pixels or cells that are responsive to reflected signal energy. In some embodiment, sensors may be arranged such that some or all of the sensors share a portion of their fields of view with one another and with the scanning signal generator. Further, in some embodiments, the relative position and poses of each sensor may be known. Also, in some embodiments, each sensor employs synchronized clock. For example, in some embodiments, sensors may be time synchronized by using a clock of one sensor as the master clock or by using an external source that periodically sends a synchronizing signal to the sensors. Alternatively, in some embodiments, sensors may be arranged to provide sensor events to sensing engines independently or asynchronously of each other. In some embodiments, scanning event cameras may be employed as sensors.

Accordingly, as a beam from the scanning signal generator beam scans across the scene, the sensors receive the reflected signal energy (e.g., photons/light from lasers) and trigger events in their cells/pixels based on detecting physical reflections in the scene. Accordingly, in some embodiments, each event (e.g., sensor event) in a sensor may be determined based on cell location and a timestamp based on where and when the reflected energy is detected in each sensor. Thus, in some embodiments, each sensor reports each sensor event independently as it is detected rather than collecting information/signal from the entire sensor array before providing the sensor event. This behavior may be considered distinguishable from many conventional pixel arrays or CCDs which may 'raster scan' the entire array of cells before outputting signal data. In contrast, sensors, such as, sensor 410, sensor 412, sensor 414, or the like, may immediately and continuously report signals (if any) from individual cells. Accordingly, the cells in an individual sensor do not share a collective exposure time rather each cell reports its own detection events. Accordingly, in some embodiments, sensors, such as, sensor 410, sensor 412, sensor 414, or the like, may be based on event sensor cameras, single photon avalanche diode (SPAD) sensors, silicon photo-multipliers (SiPM) arrays, or the like.

Figure 5:
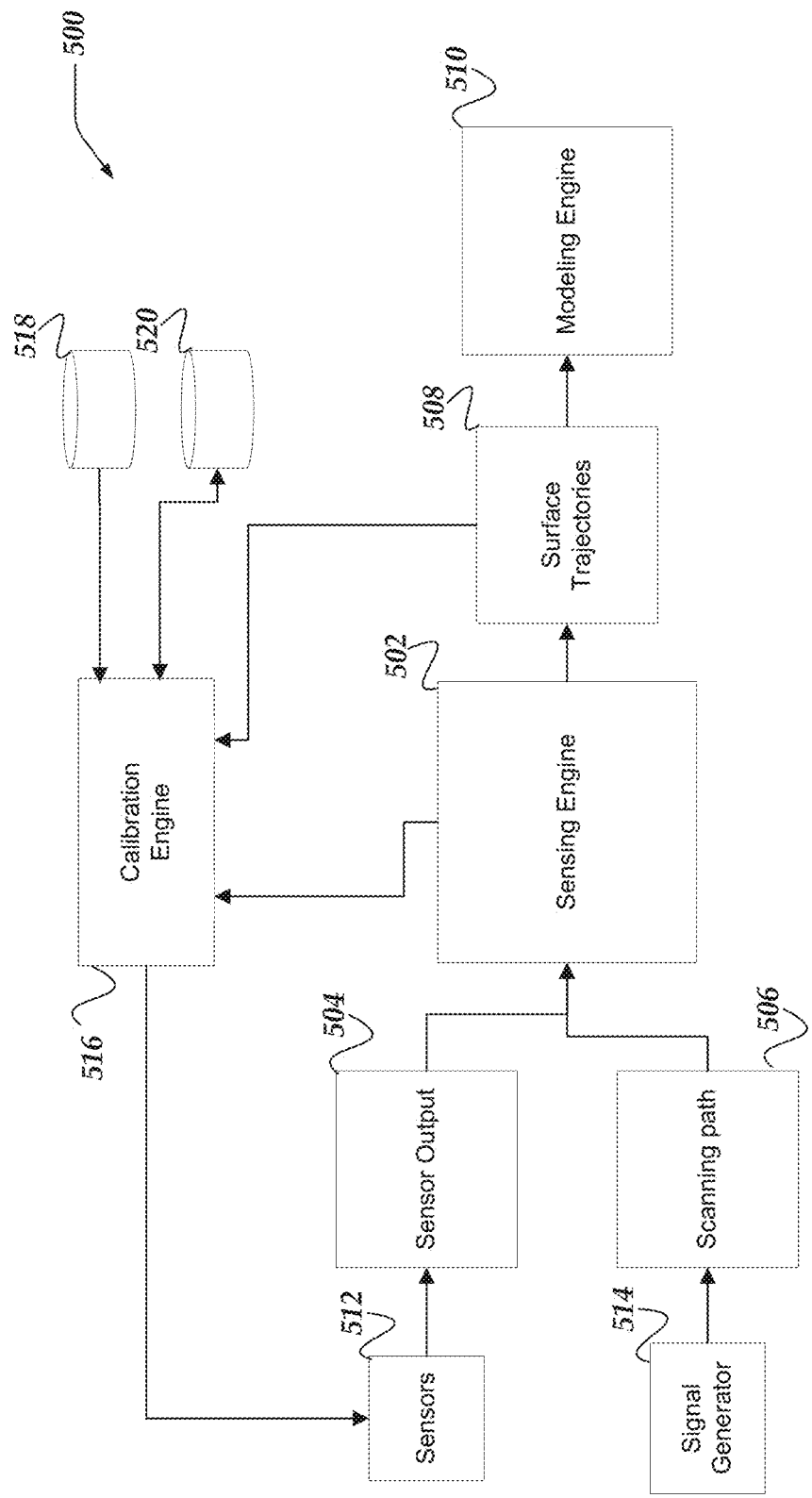
FIG. 5 illustrates a logical schematic of a system for automatic parameter adjustment for scanning event cameras in accordance with one or more of the various embodiments.

FIG. 5 illustrates a logical schematic of system 500 for automatic parameter adjustment for scanning event cameras in accordance with one or more of the various embodiments. In some embodiments, sensing engines, such as, sensing engine 502 may be arranged to be provided sensor outputs that represent sensor information, such as, location, pixel location, timing, or the like, that may be associated with sensor events. As described above, in some embodiments, signal generators, such as, scanning lasers may scan an area of interest such that reflections of the energy may be collected by sensors. Accordingly, in some embodiments, information from each sensor may be provided to sensing engine 502.

Also, in some embodiments, sensing engine 502 may be provided a scanning path that corresponds the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based the scan path and the sensor information synthesized from the sensor output 504.

Further, in some embodiments, sensors may require initial periodic calibration. For example, in some embodiments, sensors or sensing engines may expose one or more adjustable parameters, such as, high-pass filter frequency, low-pass filter frequency, photodiode current gain, voltage differential level for on-pixel level, voltage differential level for off-pixel levels, or the like. Accordingly, in some embodiments, system 500 may include a calibration engine, such as, calibration engine 516 that may initiate or perform one or more actions to automatically calibrate or adjust one or more parameters associated with sensors 512. In some embodiments, calibration engines may employ one or more calibration models to determine one or more actions for calibrating sensors or evaluating calibration information. In some embodiments, calibration models may be data instructions that declare or include one or more instructions, rules, machine-learning based classifiers, decision trees, or the like. In this example, calibration models may be considered to stored in calibration model data store 518. In some embodiments, calibration engines may be arranged to obtain calibration models from such data stores. Also, in some embodiments, calibration engines may be arranged to employ one or more calibration models based on rules, instructions, libraries, plug-ins, extensions, or the like, that may be provided via configuration information to account for local circumstances or local requirements.

Also, in some embodiments, one or more calibration parameter values may be stored in calibration profiles. In some embodiments, calibration profiles may be data structures that may be employed to record a set of calibration parameter values for sensors. In some embodiments, sensors may be employed in a variety of different operating environments that may require different calibration values. Likewise, in some embodiments, sensors may have different characteristics depending on the make, model, version, or the like. In some cases, for some embodiments, individual sensors of the same type (e.g., make, model, version, or the like) may have performance characteristics that vary within a known range or values that fall within known manufacturer tolerances. Accordingly, in some case, manufacturer tolerances may be insufficient for some accurate/precise sensing applications. Thus, in some embodiments, individual sensors may be individually characterized and calibrated to provide performance that may be more precise generalized manufacturer tolerances. Further, in some embodiments, different sensors of the same type may have different performance characteristics introduced by manufacturing variability. Accordingly, in some embodiments, calibration engines may be arranged to generate calibration profiles that represent the specific characteristic of individual sensors. Accordingly, in some embodiments, calibration profile data store 320 may be employed to store a plurality of calibration profiles determined by automatic parameter adjustment for scanning event cameras.

In one or more of the various embodiments, calibration engines may be arranged to determine a calibration model and an initial calibration profile for calibrating a particular sensor. In some embodiments, calibration engines may be arranged to execute one or more actions declared by the calibration model to set calibration parameters, measure performance features of the sensors, or the like.

In some embodiments, calibration engines may be arranged to automatically determine one or more parameter values for one or more calibration parameters based on the calibration model. In some embodiments, calibration engines may be arranged to store the determined parameter values in a calibration profile for each calibrated sensor. In some cases, for some embodiments, a same sensor may be associated with more than one calibration profiles each directed to different applications, operating environments, performance requirements, or the like.

Figure 6:
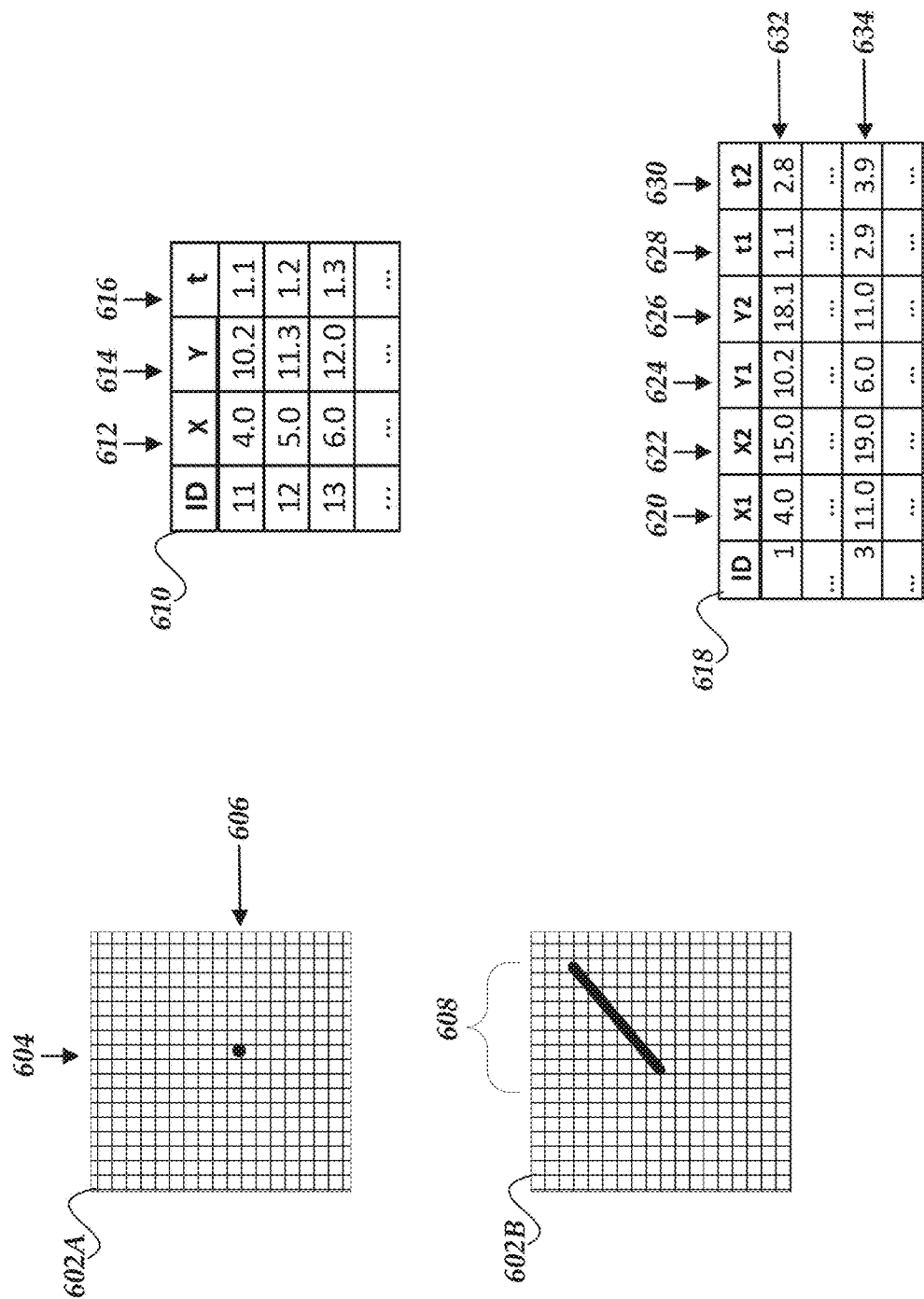
FIG. 6 illustrates a logical representation of sensors and sensor output information for automatic parameter adjustment for scanning event cameras in accordance with one or more of the various embodiments.

FIG. 6 illustrates a logical representation of sensors and sensor output information for automatic parameter adjustment for scanning event cameras in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using a various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represent a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associated sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy paths detected by the sensors. In some embodiments, sensing engines may be arranged to employ one or more data structures, such as, data structure 618 to represent a trajectory that are determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
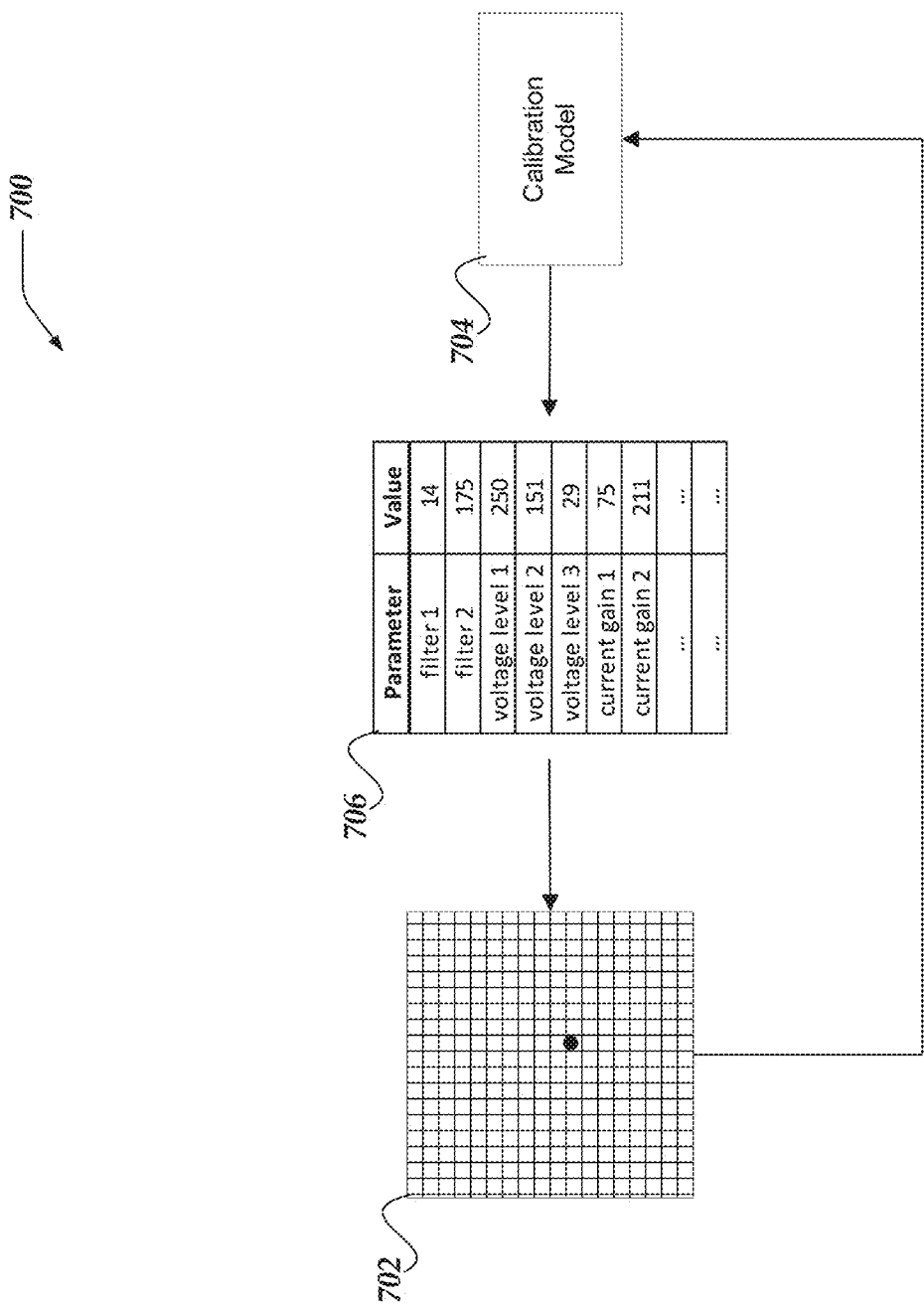
FIG. 7 illustrates a logical schematic of a system for automatic parameter adjustment for scanning event cameras in accordance with one or more of the various embodiments.

FIG. 7 illustrates a logical schematic of system 700 for automatic parameter adjustment for scanning event cameras in accordance with one or more of the various embodiments. As described above, calibration engines may be arranged to employ one or more calibration models, such as, as calibration model 704 to determine one or more calibration profiles, such as, calibration profile 706 based on features or characteristics of a sensor, such as, sensor 702.

In one or more of the various embodiments, calibration models may be data structures that declare one or more search functions, conditions, sensor evaluators, of the like, that may be directed to calibrating one or more sensors. In some embodiments, calibration engines may be arranged to employ calibration models to select values for one or more calibration parameters. Further, in some embodiments, calibration models may declare instructions for executing actions, such as, setting parameter values (e.g., accessing sensor APIs), collecting sensor characteristics, evaluating sensor response information, or the like.

In some embodiments, calibration engines may be arranged to execute calibration actions declared in calibration models until the calibration models report that the calibration of the sensor may be complete. In some embodiments, calibration models may include instructions that determine how to automatically explore range of parameter values to determine values that enable the sensor to meet one or more performance conditions or threshold results. For example, in some cases, calibration models may declare one or more actions that may include iteratively setting proposed/candidate parameter values and collecting one or more metrics associated with the performance of the sensor if using the proposed/candidate parameter values. In one or more of the various embodiments, calibration engines may be arranged to employ information, conditions, rules, or the like, declared in calibration models to determine the success criteria for calibrating a sensor for a given application.

In one or more of the various embodiments, if the calibration model determines that a sensor may be sufficiently calibrated, the calibration engine may store the corresponding calibration profile and associated it with the sensor. In one or more of the various embodiments, calibration profiles may be associated with other identifiers, tags, labels, timestamps, or the like, that enable calibration profiles for sensors to be automatically retrieved using queries. Likewise, in some embodiments, calibration engines may be arranged to provide one or more user interfaces that enable users to select one or more calibration profiles that may established the initial parameters values for a sensor calibration session.

In one or more of the various embodiments, calibration engines may be arranged to associate calibration profiles with particular sensors, sensor models, sensor versions, or the like. Likewise, in some embodiments, calibration engines may be arranged to associate calibration profiles with particular environment conditions, applications, operating environments, or the like.

Figure 8:
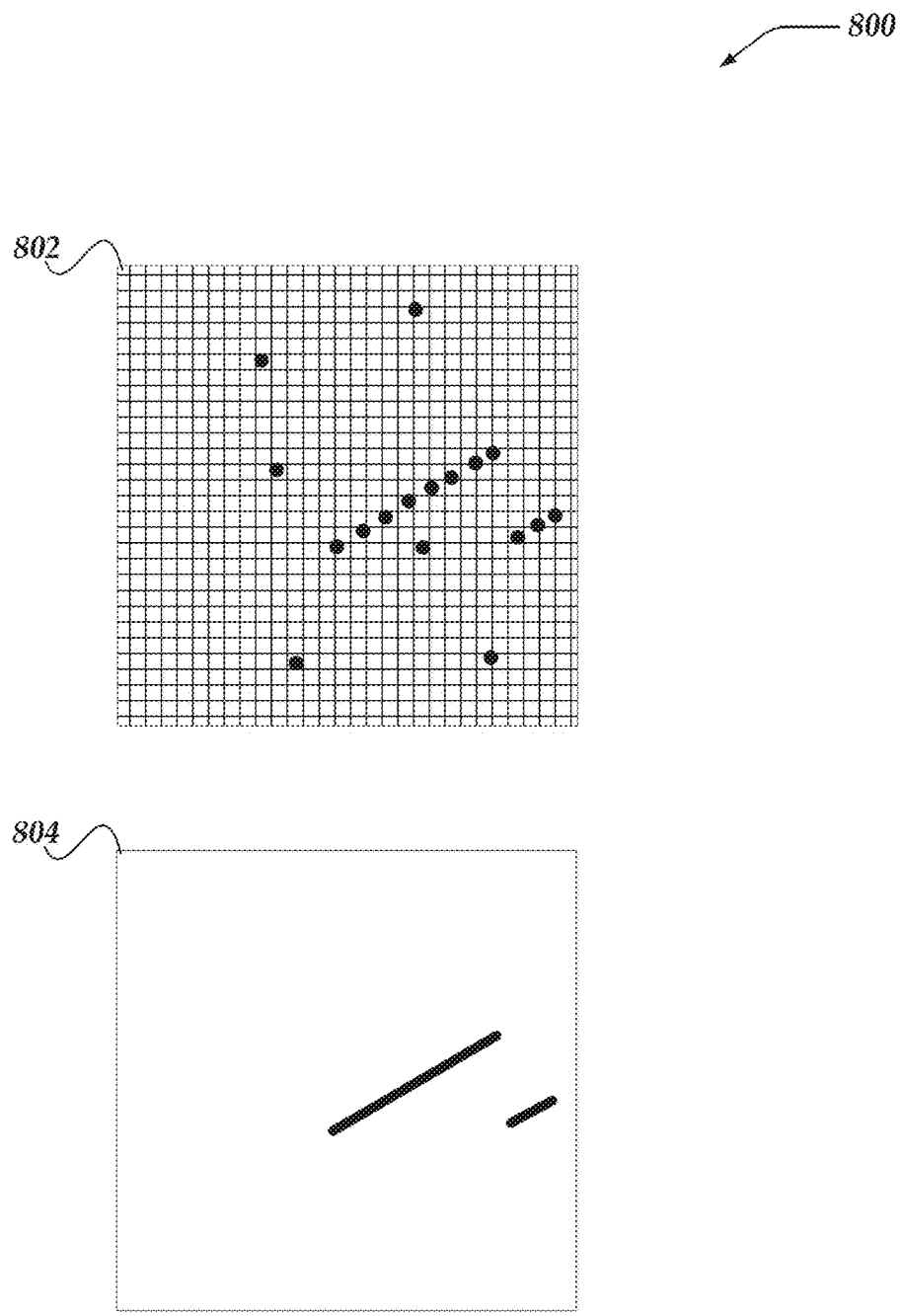
FIG. 8 illustrates a logical schematic of a system for automatic parameter adjustment for scanning event cameras in accordance with one or more of the various embodiments.

FIG. 8 illustrates a logical schematic of system 800 for automatic parameter adjustment for scanning event cameras in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 802 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 804.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, provided via configuration information to account for local requirements or local circumstances that may be associated with a sensing applications or sensors.

Figure 9:
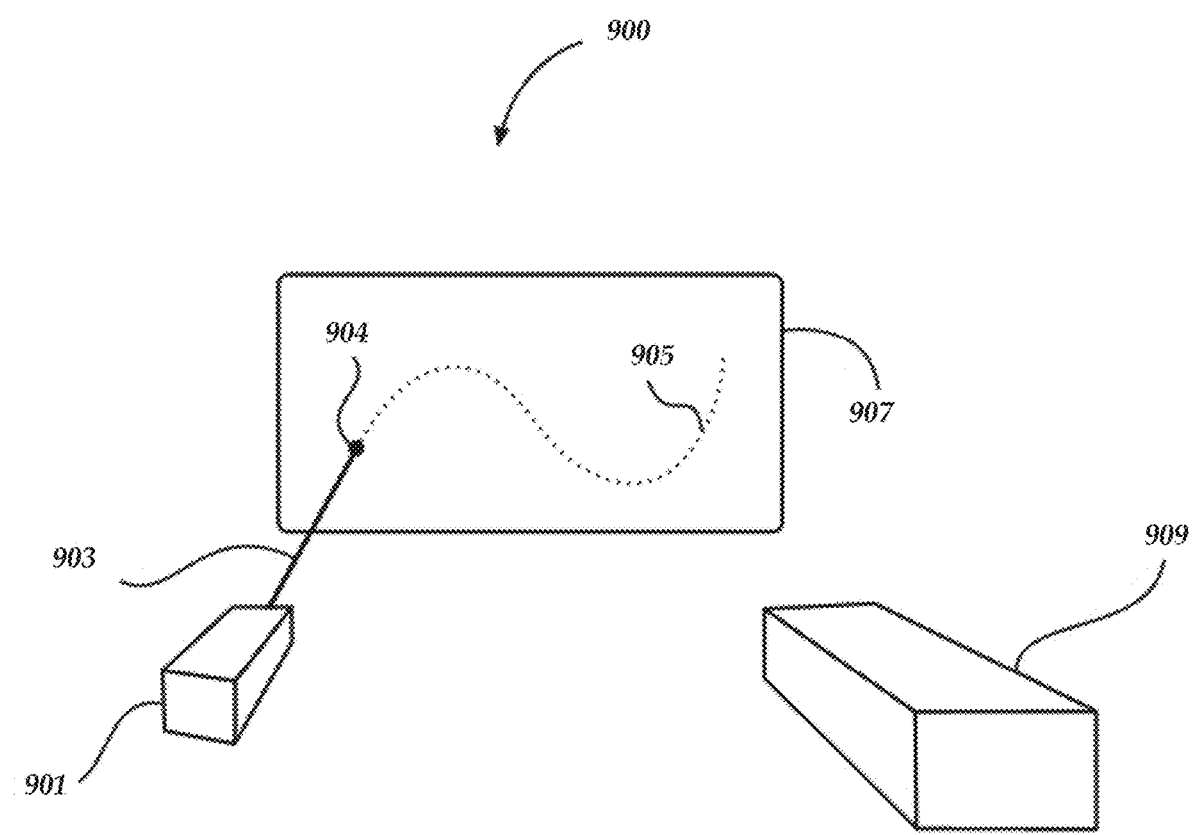
FIG. 9 illustrates a logical schematic of a system for automatic parameter adjustment for scanning event cameras in accordance with one or more of the various embodiments.

FIG. 9 illustrates a logical schematic of system 900 for automatic parameter adjustment for scanning event cameras in accordance with one or more of the various embodiments.

In this example, for some embodiments, scanning signal generator 901 may be configured to be able to scan a laser beam 903 onto a surface, for example a flat surface 907. In this example, the path 905 of the laser may be an arbitrary shape; a simple curved path is shown in FIG. 9, though scanning patterns may be simpler or more complex. In this example, the current position of the laser beam is represented by spot 904. Signal (e.g., laser beam) from scanning signal generator 901 may be scanned using any applicable method, including MEMS mirrors, galvos, or rotating polygonal mirrors. In this example, the event camera (e.g., sensor 909) may be aligned to capture the reflections of beam 903 from surface 907. Sensor 909 must be properly calibrated to receive data about the position and timing of the beam 903 as it traverses the path 905. In this example, scanning signal generator 901 may be considered to typically be a continuous wave (CW) laser, but in some embodiments the laser beam may be modulated or pulsed.

In one or more of the various embodiments, to properly calibrate sensor 909, the desired observable from the final system including the event camera sensor may be determined. Accordingly, in some embodiments, a sensor, such as, an event camera may have a number of adjustable parameters (calibration parameters) that may determine various performance characteristics, including how events at each pixel may be measured. In some sensors, one or more of these parameters may be controlled by setting digital values over an allowable range. Also, in some embodiments, one or more sensors, may be configured to allow analog control via accepting continuous values rather than being limited to discrete values.

In one embodiment of the invention, event camera 909 may be calibrated for use in scanning measurements of object positions, for example 3-D scanning. In a particular embodiment, the parameter to optimize for may be increased length of continuous paths or trajectories on objects or surfaces. In one example of an ideally calibrated event camera, the sensor camera may be calibrated to register events that are desirable as signal while not picking up noise.

Figure 10A:
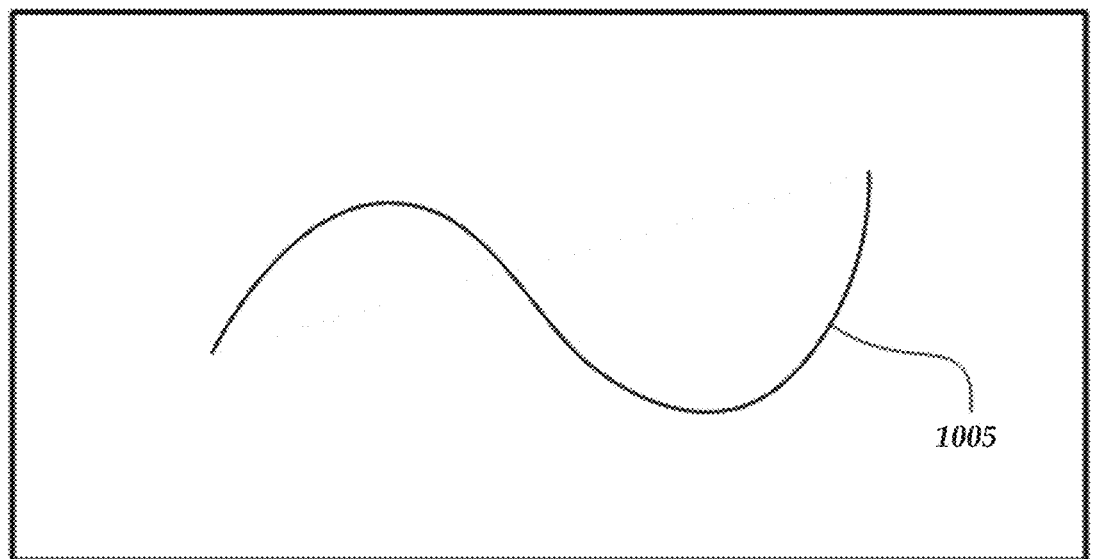
FIG. 10A shows a diagram representing one possible desired output of the sensor array of the camera in accordance with one or more of the various embodiments.

FIG. 10A shows a diagram 1009 representing one possible desired output of the sensor array of the camera 909. Though the X-Y grid of pixels in the image sensor of the camera 909 appears similar to a standard CMOS image sensor, they are not equivalent, as each pixel in the sensor array can be triggered independently in time. In this example, path 1005 may be considered a signal that corresponds to the path 905 of scanning signal generator 901 as traced out on surface 907, and comprises points triggered as an event if the spot 904 of the laser scanned on the corresponding surface point imaged by the camera. Each pixel may be associated with a timestamp that corresponds to the time the laser spot 904 appeared on path 905. Note, in some embodiments, surface 907 need not be flat, but calibration may be simplified if it is at least relatively continuous.

Figure 10B:
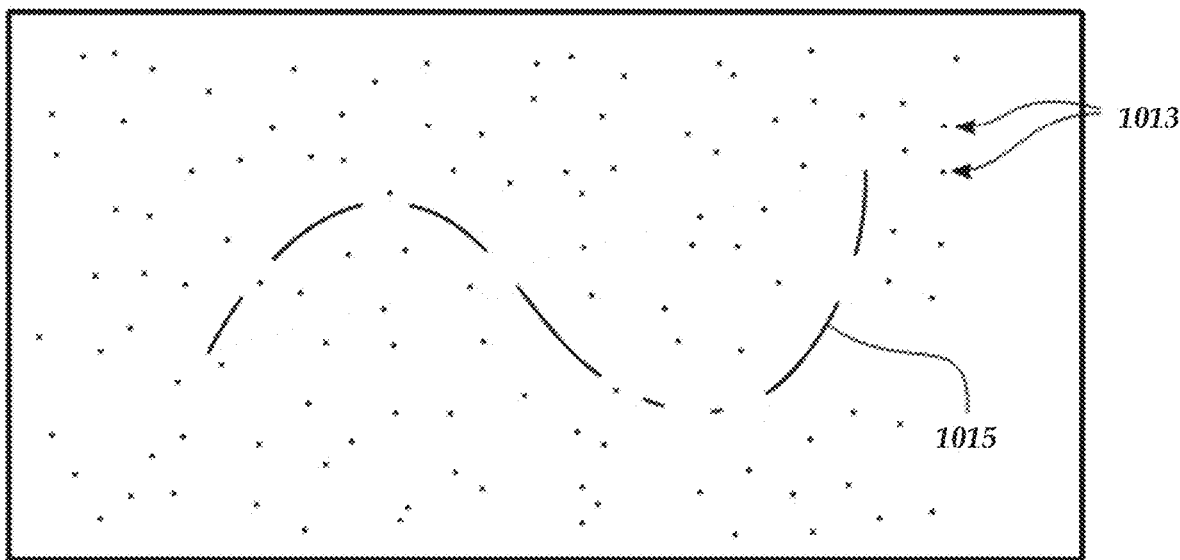
FIG. 10B represents a scanning path imaged onto the sensor array of a sensor under less than ideal calibration or environmental conditions in accordance with one or more of the various embodiments.

FIG. 10B represents the same path 905 imaged onto the sensor array of sensor 909 under less than ideal calibration or environmental conditions. In this example, path 1015, which refers to the entire path, also corresponds to path 905 but has many gaps where the pixels along the path did not trigger. In addition, there may be additional noise appearing for any number of reasons, including dark current, ambient light, or others. For example, noise 1013 may appear across the entire sensor array, and may act as interference on obtaining good signal quality. While it may be advantageous to adjust parameters to eliminate noise completely, in practice this may be difficult or impossible. Noise may interfere with the signal in multiple ways, but often affects signal such as paths 1005 and 1015 in two ways. First, noise events may show up on or near the paths and make determination of which events belong to the paths less certain. Second, too many events occurring at the same time may cause problems with time arbiters in the event camera circuitry that associate a timestamp to each event. Although nominally each pixel may be triggered completely independently, each camera's hardware may impose limits on the total number of events that may be counted within any particular time window. By limiting the number of pixel noise events, it may be more likely that pixel signal events will be tracked and assigned to the proper time. In some cases, it may be advantageous to adjust the calibration parameters so that some noise may remain present across the sensor array, where at the same time the signal quality of continuous paths may be improved. For example, calibration parameters configured to eliminate noise may cause other side-effects that may degrade a sensors overall performance for a particular application.

Assigning signal events to a continuous path or trajectory has been described elsewhere, but in general the process is as follows. In one embodiment, a beam may be scanned across the surface of an object with a continuous laser. It may be simpler to assign events to a particular path if the object may be a generally continuous surface, but it is possible to obtain continuous path events from one or more objects of different shapes, though the continuous paths may then have shorter average lengths. Events may be triggered sequentially on a surface of an object at neighboring or near pixels. Events at pixels in close proximity spatially to one another are also examined for their timestamps to determine if these events also trigger near one another in time as well. For example, the first condition applies if the distance between two pixels, $d_{12} < d_{event}$ where $d_{event}$ is a distance selected based on environmental conditions or other considerations, but is based on distance within the sensor array. In some cases, $d_{event}$ may be as close as an exact neighboring pixel, or chosen to be a few pixels away. And, for example, the second condition applies if the timestamp between two pixels, $t_{12} < t_{event}$, where $t_{event}$ is based primarily on the scanning speed of the laser spot across the surface compared to the time resolution of the event camera.

In one or more of the various embodiments, typically the scanning speed of the scanning signal generator (e.g., laser) may be known, and so the approximate time difference between when two different pixels at a given distance should be known by the system as well. If both of these conditions are met, the two pixels are assigned to the same continuous path. In general, pixels may be assigned to one continuous path until there may be a discontinuity in the path. Noise events can be compared both in distance and time to the current path's last event to determine if this is a noise event and thus should be discarded, or else if this is a pixel from a different path. Noise events need not interrupt the continuity of a particular path if subsequent events still fall within the constraints where distance and time remain less than $d_{event}$ and $t_{event}$ respectively. In some embodiments, sensing systems may be calibrated using a beam of unknown scanning speed, where $t_{event}$ could also be treated as an independent variable to be optimized.

Figure 10C:
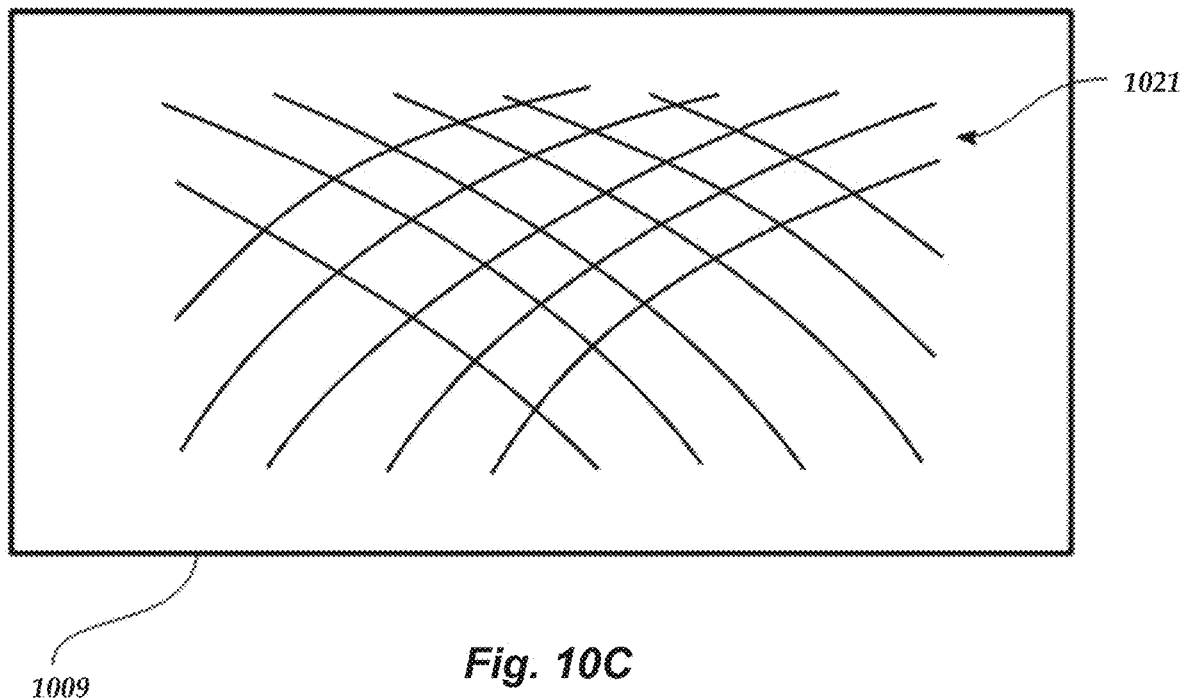
FIG. 10C shows a set of continuous paths where each curve on the set of paths may be marked as a continuous path with a path length in accordance with one or more of the various embodiments.

FIG. 10C shows a set of continuous paths 1021 where each curve on the set of paths may be marked as a continuous path with a path length. In some embodiments, more than one path may be captured by the sensor over each object, and the average length of the various paths on the object is calculated. In this figure, each path may be taken at slightly different times; the figure shows a number of continuous paths overlaid on the same diagram for illustrative purposes, but in practice these paths may be treated separately as they may be captured by the same scanning beam. The average path length over a number of scans may be the metric that may be increased while optimizing calibration parameters for sensors, such as, event cameras.

Figure 10D:
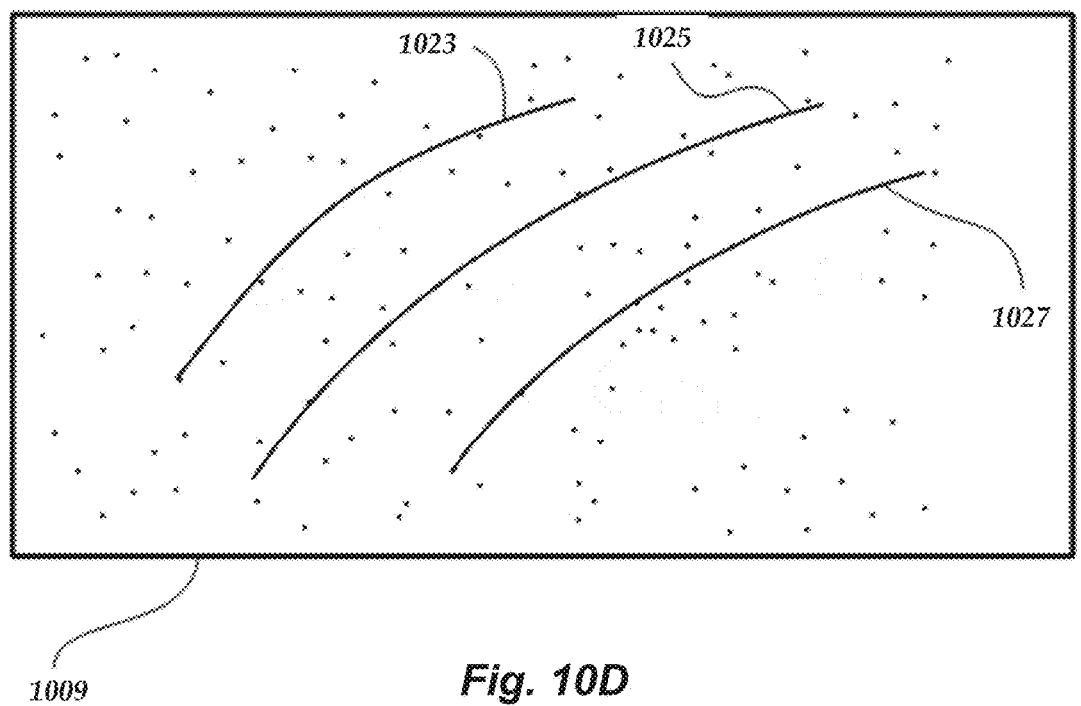
FIG. 10D, one example shows three different lasers (scanning signal generators) scanned across the surface of an object simultaneously in accordance with one or more of the various embodiments.

Also, in one or more of the various embodiments, multiple scans may be performed simultaneously for calibration. In FIG. 10D, one example shows three different lasers (scanning signal generators) scanned across the surface of an object simultaneously. Paths 1023, 1025, and 1027 may be measured on the event camera as independent continuous paths. Points on each path may be unambiguously assigned to each of paths 1023, 1025, or 1027 since the same criteria where two pixel events may be closer in space and time than thresholds $d_{event}$ and $t_{event}$ to be assigned to one of the continuous paths. Note that these paths may be reasonably well disambiguated even in the presence of noise as measured on the sensor array if the noise may be below a certain threshold. In some embodiments, events may be assigned to the correct path because of the restriction of spatial distance between one pixel event and the next even though events from multiple paths might be detected simultaneously.

A number of parameters may be tuned to best optimize sensors system. Some may be intrinsic to event camera 909, whereas others apply to the sensor system as a whole. Intrinsic parameters for the camera may include high-pass filter frequency, low-pass filter frequency, photodiode current gain, voltage differential level for on-pixel level, voltage differential level for off-pixel levels, or the like. In some sensor cameras, the parameters may be set using 8-bit values (0 to 255), while others may be set with a wider range of values or perhaps even analog values.

In one or more of the various embodiments, one or more calibration parameters may be extrinsic to the sensors as part of the system 900. For example, in some embodiments, such calibration parameters may include laser power, laser frequency, expectation of pixel firing rate, algorithmic changes in classification of noise vs. signal pixels, event rate to avoid of timestamp bottlenecks in camera circuitry, pattern and speed of the laser scan, effective width of laser spot, camera bandpass filters for ambient light rejection, variety and shape of objects in the field of view, or the like. Some or all extrinsic calibration parameters may be changed systematically, possibly to be included in an optimization search; these parameters may likely include laser power and laser scanning speed. Other extrinsic parameters such as laser spot width along with laser power and scanning speed may have large effects on how to set the intrinsic camera parameters.

In one embodiment of the calibration method, extrinsic parameters may be set first, particularly laser power and scanning speed and path. Certain other parameters, such as laser spot size, may be more difficult to change depending on the optical configuration of the scanning laser. Extrinsic parameters may be set to previous known working values to begin the process based on a calibration profile, but if a calibration profile may unavailable, a reasonable set of arbitrary settings may be determined from a default starting calibration profile and then path lengths of a simple target object may be measured quickly to ensure that some signal is present. If a signal may be determined, optimization of the intrinsic parameters of the sensor may begin.

In one embodiment, optimization of digital parameters may be based on coordinate descent methods. At first median values of the intrinsic parameters may be chosen as a starting point if no other information has been mapped in the system, or else a system operator can make a guess at reasonable parameters. In some embodiments, an initial calibration profile may be determined.

At first, while mapping out the search space for a parameter, smaller incremental adjustments to parameter values may be tried; even though parameters may change only slightly. Because a metric such as continuous path length may vary nonlinearly with changes to calibration parameter values, care must be taken to avoid missing possible maxima or losing the signal entirely. As the search space is mapped out, larger steps may be taken to speed up the search, particularly since changes in event camera parameters may take a relatively long time to settle, as long as 1 second in some cases. Making the search more efficient with time will improve the efficiency of later calibrations if conditions change. In one variant, an event camera may allow a finer gradation of parameters which allows for smaller changes between settings; under these conditions, more than one parameter might be changed simultaneously using a method analogous to steepest descent.

Conditions for calibration of calibration parameters may vary widely. In this case, after a system 900 has been measured and calibrated under a variety of conditions, calibration engines may be arranged to may store a library of known good parameter settings as calibration profiles for use as starting points in subsequent calibrations. In some embodiments, calibration engines may be arranged to try various available calibration profiles rather than arbitrarily selecting an initial set of parameters. Accordingly, in some embodiments, calibration engines may be arranged to iteratively try different calibration profiles to the calibration profile that produces the best results. Additionally, in some embodiments, calibration engines may be arranged to prioritize the order which calibration profile to use based on one or more environmental conditions. For example, if ambient light measured by a system may be above of threshold value, initial starting conditions may be biased toward lower light sensitivity with different voltage triggers for a measured event. In some embodiments, external environmental sensors (e.g., light meters) may be used to measure environmental conditions. Also, in some cases information from the event camera itself or the sensing engine may provide information such as signal-to-noise ratios that would help determine better starting parameters. In some embodiments, calibration of the system may occur before using it in a sensing application, but under some circumstances calibration may be done more dynamically. In some embodiments, if an event camera has improved circuitry where changes to parameters settle relatively quickly, calibration engines may be arranged to execute calibration automatically while the sensing system may be at rest.

In one or more of the various embodiments, while maximizing average continuous path lengths may remain a primary metric, additional information for improving the speed of converging on the best set of calibration parameters may be informed by secondary metrics. In one embodiment, one secondary metric would occur while measuring events where the timestamps are too close to one another. Though assigning events to distinct paths requires near pixels to have timestamps that are also near, time spacing becoming too short is evidence of a different problem. If the scanning speed of the laser could not possibly produce events at different pixels that quickly, timestamp bunching may be the cause. Timestamp bunching may occur, for example, if gain sensitivity may be set too high or voltage thresholds for signals may be set too low. Not only does this result in much greater number of noise events, but because the timestamp arbiter circuitry may become swamped under these conditions, the times measured may be inaccurate. By requiring that events be greater than an arbitrary time amount before assigning new events to a continuous path, this may avoid incorrectly maximizing the primary metric. Additionally, a condition such as timestamp bunching may signal to the parameter optimizer that a completely different direction of search is needed. This base time value may vary based on the event camera circuitry as well as other extrinsic factors.

In another embodiment, effective spot size of the laser as measured on the sensor array may be employed as another secondary metric. The actual spot size, such as, spot size 904 on an object may vary based on many factors, including laser configuration, laser scanning optics, distance to object, or the like. In some embodiments, actual spot size may have the greatest effect, though other camera parameters may change the effective spot size as measured by an event camera. Under one set of ideal conditions, the actual spot size of the laser would be similar in size to the size imaged to cover about one pixel of the sensor array. Closer match of an imaged spot with a pixel size is desirable because of the nature of event camera pixels. Each event from an event camera may generally contain three pieces of information, (X, Y, timestamp), where X and Y correspond to the pixel coordinates in the sensor array, and the timestamp gives, down to the time resolution of the camera, the exact moment when the event was triggered by changes in incoming light to the pixel. Because of this mechanism, in some embodiments, an event camera may give off no direct information about light intensity, that is, no grayscale information about the scene or the scanned laser may be measured directly. An event camera with optics that match the laser spot size to the pixel size would unambiguously detect when the laser is scanning precisely at that pixel. However, this condition may be impractical or otherwise disadvantageous. In practice, a laser spot is generally nonuniform, and may have a varying intensity profile across the spot; often this is a Gaussian or other similar function. Even under matching spot sizes, it may be far more common for the center of the laser spot's point spread function (PSF) to be in between pixels, potentially causing multiple adjacent pixels to trigger at nearly the same time.

In some embodiments, intrinsic parameters may be set to vary the effective spot size on the sensor array. Even if the physical spot does not change size, by changing sensitivity, filter levels, and threshold voltages may make the sensor array appear to show a spot size different than the actual size (the effective spot size). If too many pixels are triggered by a large spot size on the sensor array, the center may be difficult to determine with accuracy, in addition to causing potential timestamp bunching. If too few pixels along a path may be triggered as the laser spot is scanned, not only might the path positioning by inaccuracy, but also the edges of objects, delineated by the beginning and ending of continuous paths on the sensor, might be missed. Scans where the primary metric of increased path lengths may be distinguished from others with similar values by analyzing the effective spot size on each path. Proper setting of parameters to set best effective spot size will also decrease time jitter of each event, further improving position accuracy of the event path. Tuning of the effective spot size should be done such that signal is never removed from the spot on the sensor array at the center of the laser PSF, but instead tuning should be done to degrade signal from pixels surrounding this to improve other aspects of the signal, or to reduce noise.

In a separate embodiment, the primary metric for optimization may be minimizing time differences between event timestamps and expected values for these timestamps of the path of the laser. In a system, such as, system 900 if positioning of the exact path of the scanning laser may be well known, each event may show up at a particular position at a given timestamp. This method may be used if conditions are well controlled, with known locations in time of both the laser beam as well as the object to be scanned for calibration. By setting parameters to minimize this discrepancy, event latencies may be improved. If intrinsic parameters are set incorrectly, pixel events can fire with various latencies based on incoming levels of light to the pixel. Lowering this latency across a range of incoming intensities will improve both positional accuracy, but also consistency. Using this metric of minimizing timestamp discrepancies, the optimization methods are almost exactly the same as used for the other primary metric of maximizing continuous path lengths; similar secondary metrics may be used as well. In a particular embodiment, the position of the scanning laser in time is measured precisely by another method, and thus exact knowledge of control of the laser beam or object need not be known ahead of time.

In another embodiment, both of the preceding metrics may be used for optimization with different priority. For instance, the primary metric may be increasing the average path lengths measured, but also using timestamp discrepancy as a secondary metric to speed up the parameter search. Conversely, minimizing timestamp discrepancies may be used as the primary metric, while a secondary metric is maximizing path lengths.

In yet another embodiment, camera 909 may be chosen to allow per-pixel parameter adjustments to allow for fine tuning other aspects of extrinsic parameters. For example, pixels across the field of view might have different amounts of light entering them based on angle of the field of view, either from vignetting of camera optics or else from varying frequency response to angle in a bandpass filter. Small adjustments over the entire array may be done to even out pixel response. In a variant, other configurations would be possible. In one example having different parameter settings corresponding to different patterns of pixels across the array would be a "checkerboard" pattern of pixels, where half of the pixels are tuned to one set of parameters while the other half of the pattern of pixels is tuned to a completely different set of parameters. This might allow for sensor cameras to pick up details both near and far simultaneously with improved signal recognition.

Figure 11:
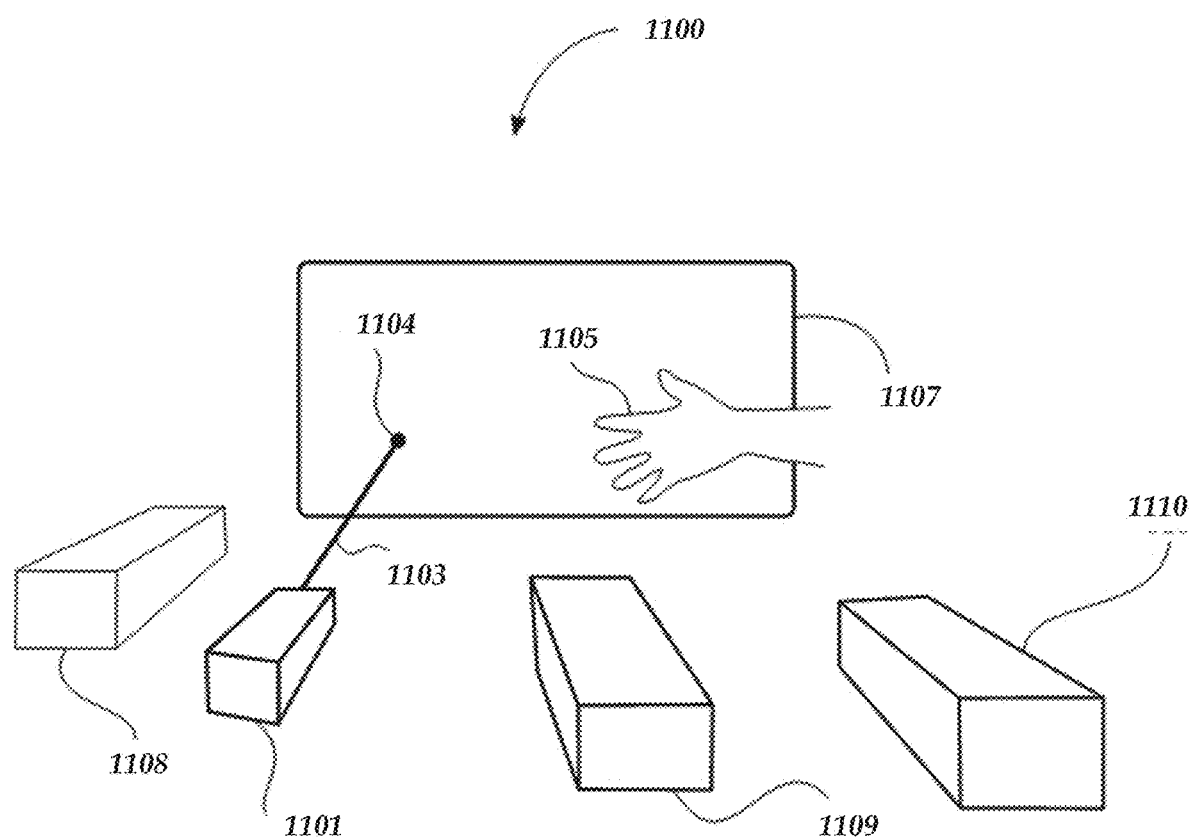
FIG. 11 shows one example of a 3-D measurement system in accordance with one or more of the various embodiments.

In one embodiment of the invention, calibration of one or more event cameras may be done in a system that is closer to a desired application. FIG. 11 shows one example of a 3-D measurement system. System 1100 comprises two or more cameras. In this example, three cameras 1108, 1109, and 1110 are shown. The fields of view of the three cameras are chosen and aligned to at least partially overlap with one another. Laser 1101 scans laser beam 1103 at least partially overlapping the field of views of all three cameras. Laser spot 1104 may be scanned in a variety of patterns of different density to extract 3-D positioning data about objects in the cameras' fields of view. In this example, a hand 1105 may be considered to represent a hand that is held in front of flat object 1107.

Figure 12:
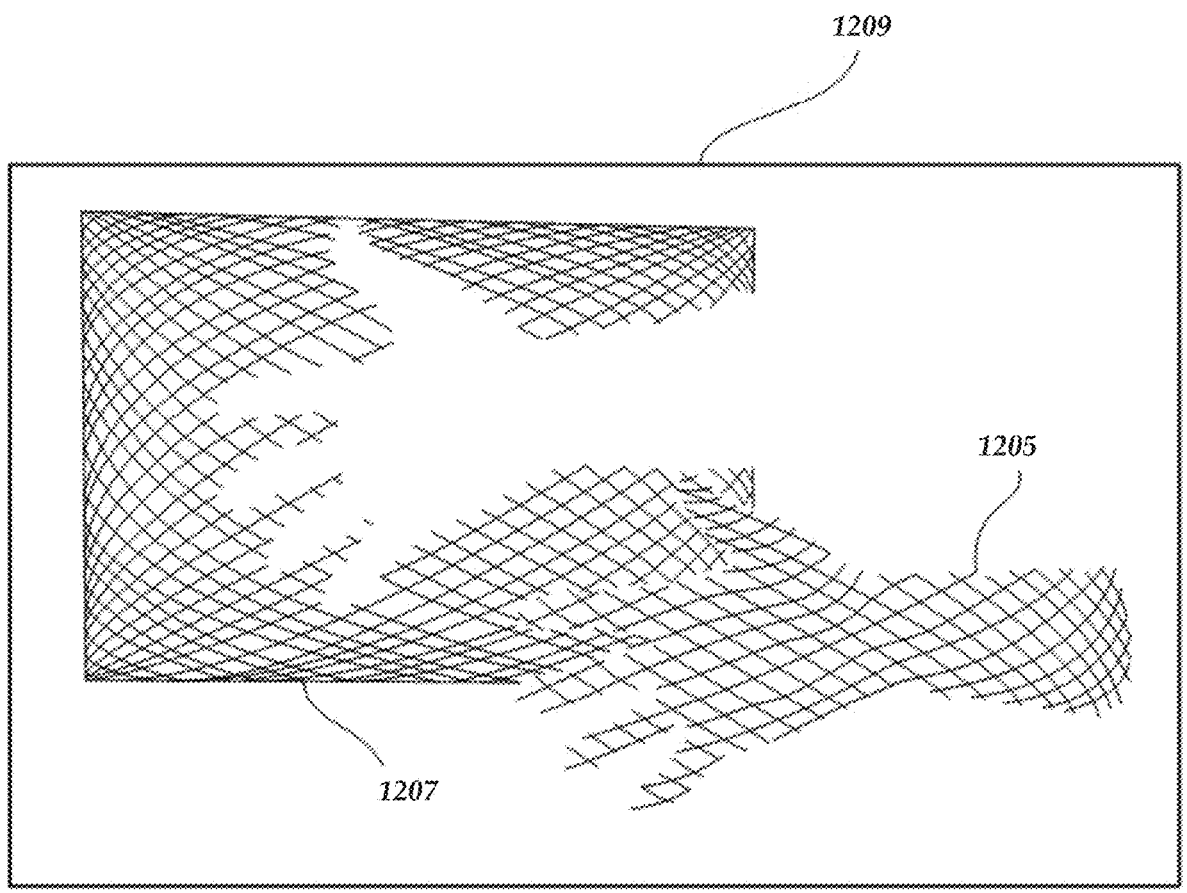
FIG. 12 is a diagram showing the output of a sensor array of one of event cameras in accordance with one or more of the various embodiments.

FIG. 12 is a diagram 1209 showing the output of a sensor array of one of event cameras 1108, 1109, or 1110. In this example, the laser spot has traced out an arbitrary pattern over time intended to cover much of the space to be measured. The pattern intersected both the flat surface 1107 as well as the hand 1105, resulting in patterns 1207 and 1205 respectively. Continuous paths measured from surface 1107 may be distinguished from paths that reflect from the hand 1105; when the laser is scanned across the field of view of the sensor array, there may be a discontinuity in the scan if laser spot 1104 jumps from the surface 1107 to the hand 1105. Repeated scanning and filling in of these patterns give information as to the positions of each portion of each object. Because two or more cameras may be observing the same laser beam scan across these surfaces, precise 3-D information may be calculated.

In some embodiments, calibration of event cameras 1108, 1109, or 1110, may be done either concurrently or consecutively. In some embodiments, this may be achieved using either of the two primary metrics listed earlier, maximizing continuous path length, or minimizing timestamp discrepancies. Although path lengths may be more variable when using a dynamic and moving object such as a human hand, calibration under these conditions might result in a more robust system that is less sensitive to changing environmental conditions, or a wider variety of objects to be measured.

In another embodiment, system 1100 may be calibrated while the sensing system may in use. Whereas it may be useful to calibrate each camera independently first, based on deteriorating or changing metrics while in use it may be necessary to calibrate while the system is active. This may be done even when using event cameras that have slow settling times when changing parameters. In system 1100 as shown, two cameras may be used actively, while one camera undergoes a full calibration cycle. In a variant, calibration of this camera may only involve a minor optimization search to improve primary metrics without searching too far away from current settings. Either way, after one of the cameras is recalibrated, it may become active again, then one of the other cameras could deactivate for calibration in turn, until all cameras are well-calibrated again. In some circumstances, the dynamic calibration may be triggered by changes in ambient light levels.

In a particular embodiment, a system 1100 with three or more cameras may allow for simpler calibration using the method of minimizing timestamp discrepancies. Because two of the cameras when calibrated well can determine not only the position of the objects being measured, but also the position of the laser beam spot 1104 at any given time, information from two of the cameras can help more accurate calibration of the third camera during initial setup, but may also allow fine-tuning of parameters during use to improve signal quality.

In another embodiment, the cameras in system 1100 may have different parameter settings. For example, two cameras 1108 and 1109 may be setup to optimize results when the laser reflects off of nearer objects, while camera 1110 may be optimized to measure events from farther objects, or possible increased sensitivities. Many other combinations are possible using additional cameras in the system. For instance, some cameras may be more sensitive to low light levels while others are set with less sensitivity to scanned light, but also less sensitivity to other light interference.

In another embodiment, the event camera or cameras as described may be replaced by a camera with a different sensor mechanism, for instance a camera where the sensor array is SPAD (single photon avalanche diode) array. A SPAD array camera triggers with one or more photons hitting each pixel based on reverse biasing of the photodiode at each pixel. Though the method of obtaining a signal is different in a SPAD array camera than in event camera 909, there are some similarities, particularly that events may be extracted from the data with (X, Y, time) information. Extrinsic parameters may remain much the same for a system including a SPAD array camera, though intrinsic parameters may be different. This set of intrinsic and extrinsic parameters may be optimized through nearly exactly the same process as described earlier, using primary metrics of maximizing continuous path length or minimizing event timestamp discrepancies.

Generalized Operations

FIGS. 13-16 represent generalized operations for automatic parameter adjustment for scanning event cameras in accordance with one or more of the various embodiments. In one or more of the various embodiments, processes 1300, 1400, 1500, and 1600 described in conjunction with FIGS. 13-16 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 13-16 may perform actions for automatic parameter adjustment for scanning event cameras in accordance with at least one of the various embodiments or architectures such as those described in conjunction with FIGS. 4-12. Further, in one or more of the various embodiments, some or all of the actions performed by processes 1300, 1400, 1500, and 1600 may be executed in part by sensing engine 322, modeling engine 324, or calibration engine 326 running on one or more processors of one or more network computers.

Figure 13:
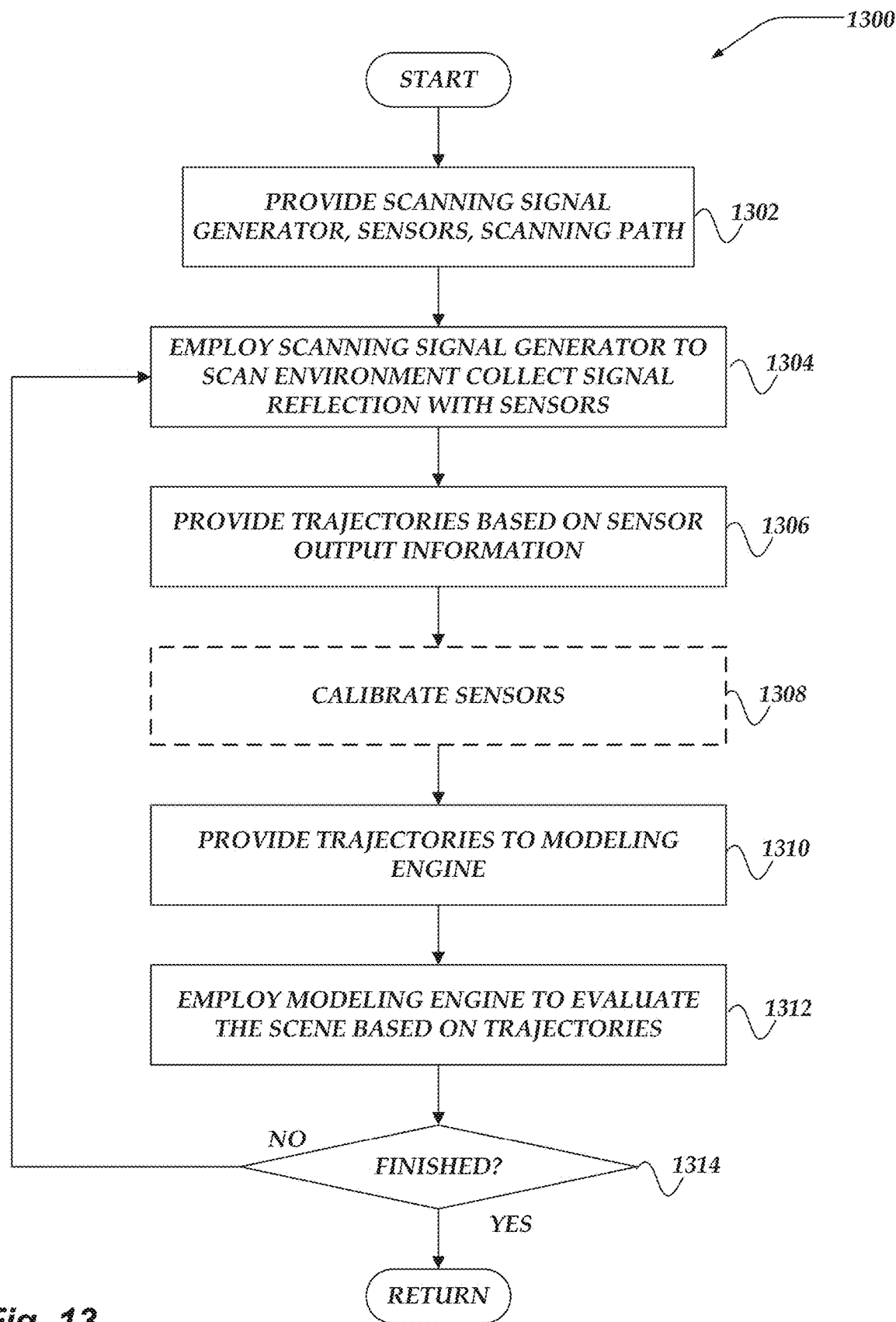
FIG. 13 illustrates an overview flowchart of a process for perceiving objects based on sensing surfaces and sensing surface motion in accordance with one or more of the various embodiments in accordance with one or more of the various embodiments.

FIG. 13 illustrates an overview flowchart of process 1300 for perceiving objects based on sensing surfaces and sensing surface motion in accordance with one or more of the various embodiments. After a start block, at block 1302, in one or more of the various embodiments, one or more scanning signal generators, one or more sensors, or the like. Also, in some embodiments, a specific scanning path may be provided to direct the beam or signal from the scanning signal generator to traverse a specified curve or path through a scanning environment. At block 1304, in one or more of the various embodiments, sensing engines may be arranged to employ the scanning signal generator to scan a signal beam through the environment of interest to collect signal reflections of the signal at the sensors. At block 1306, in one or more of the various embodiments, sensing engines may be arranged to provide scene trajectories based on the sensor output information. At block 1308, in one or more of the various embodiments, optionally, calibration engines may be arranged to perform one or more actions to calibrate the sensors or other portions of the system. At block 1310, in one or more of the various embodiments, sensing engines may be arranged to provide one or more scene trajectories to a modeling engine. At block 1312, in one or more of the various embodiments, modeling engines may be arranged to evaluate the scene in the scanned environment based on the trajectories. Modeling engines may be arranged to employ various evaluation models that may be tuned or trained to identify one or more shapes, objects, object activity, or the like, based on trajectories. At decision block 1314, in one or more of the various embodiments, if the scanning may be finished, control may be returned to a calling process; otherwise, control may loop back to block 1304.

Figure 14:
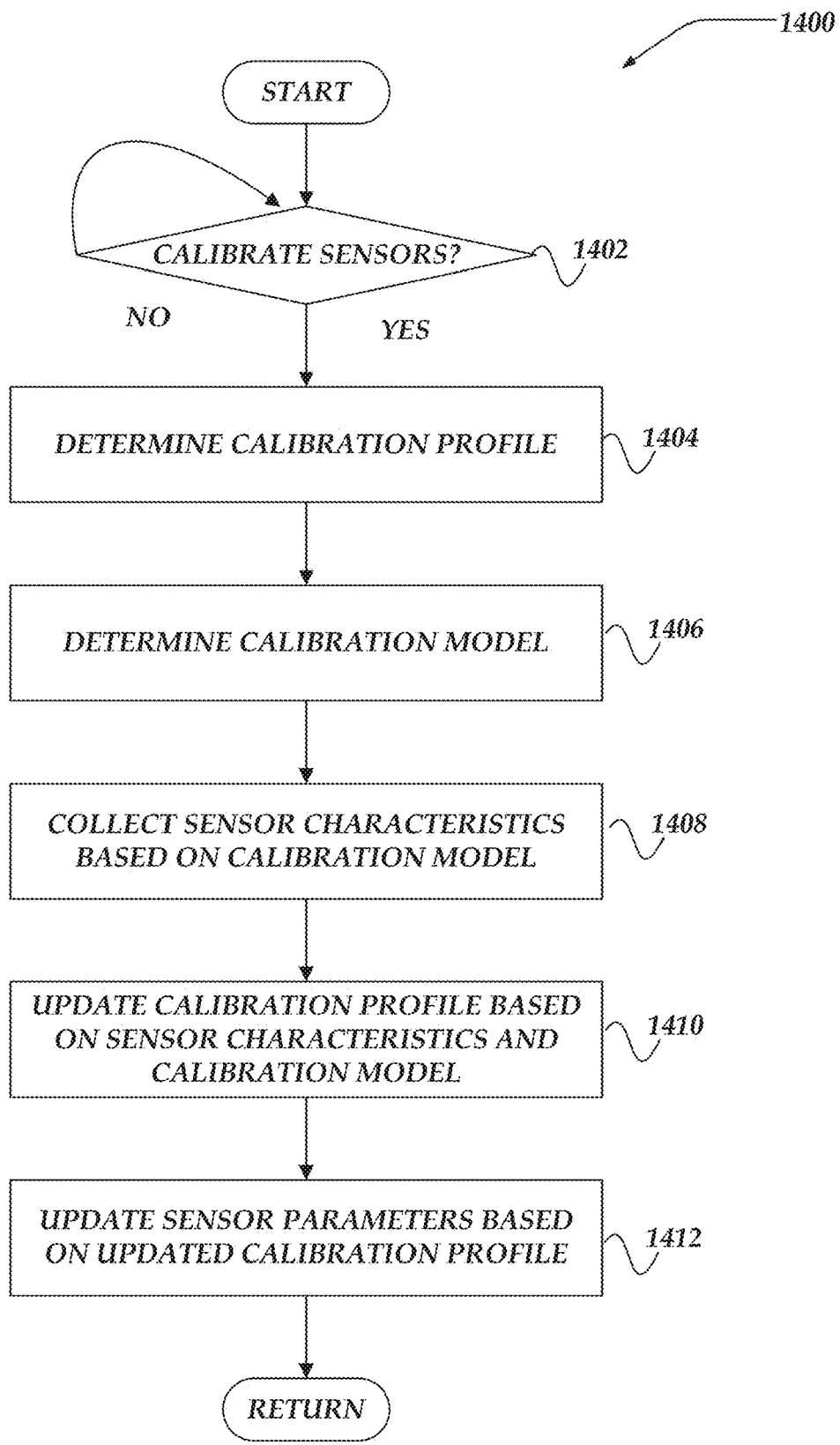
FIG. 14 illustrates a flowchart of a process for automatic parameter adjustment for scanning event cameras in accordance with one or more of the various embodiments.

FIG. 14 illustrates a flowchart of process 1400 for automatic parameter adjustment for scanning event cameras in accordance with one or more of the various embodiments. After a start block, at decision block 1402, in one or more of the various embodiments, if the sensors may be calibrated, control may flow to block 1404; otherwise, control may loop back to decision block 1402. In some embodiments, sensors may be calibrated before a sensing system may be used for a given application. Also, in some embodiments, sensors may be arranged during lulls or idle periods of given sensing session.

At block 1404, in one or more of the various embodiments, calibration engines may be arranged to determine one or more calibration profiles. As described above, in some embodiments, calibration profiles may be employed to store one or more calibration parameters for a sensor as a collection of parameters with values.

In one or more of the various embodiments, particular default or initialization calibration profiles may be associated with particular sensors based on sensor make, model, or version. Likewise, in some embodiments, calibration profiles may be categorized based on application or operating environments. Further, in some embodiments, the sensing system may have previously calibrated the sensor under consideration. Thus, in some embodiments, calibration engines may be arranged to select the previously generated calibration profile for the sensor of interest.

Also, in some embodiments, calibration engines may be arranged to provide one or more user interfaces that enables users or administrators to select a calibration profile.

At block 1406, in one or more of the various embodiments, calibration engines may be arranged to determine one or more calibration models. As described above, calibration models may be data structures arranged to store rules, instructions, success criteria, or the like, for calibrating sensors. In some embodiments, calibration engines may be arranged to determine calibration models based on one or more characteristics or the sensors under consideration. Likewise, in some embodiments, one or more calibration models may be directed to particular applications or operating environments.

In one or more of the various embodiments, calibration models may declare one or more actions for setting parameter values, evaluating sensor responses, or the like. For example, in some embodiments, a calibration model directed to a particular sensor type may include specific instructions for interfacing with that sensor type. Similarly, for example, in some embodiments, the calibration model may include instructions for collecting performance metrics that may be used to evaluate the sensor.

In one or more of the various embodiments, calibration models may include instructions for directing other components of the sensing system, including controlling the scanning signal generators. In some cases, controlling other components may be employed to exercise the sensors being calibrated. Also, in some embodiments, calibration models may be configured to execute one or more actions for calibrating one or more parameters of the sensing system that may be extrinsic to the sensors themselves.

At block 1408, in one or more of the various embodiments, calibration engines may be arranged to collect one or more sensor characteristics based on the one or more calibration models. As described above, calibration models may be configured to declare actions that calibration engine may execute to collect one or more metrics associated with the performance of the sensors or sensor system.

At block 1410, in one or more of the various embodiments, calibration engines may be arranged to update the one or more calibration profiles based on the collected sensor characteristics and the one or more calibration models.

At block 1412, in one or more of the various embodiments, calibration engines may be arranged to update one or more sensor calibration parameters based on the updated calibration profiles. As described above, in some embodiments, calibration profiles may be stored with identifiers that may be employed to be associated a calibration profile with a given sensor for a given application or operating environment. Accordingly, in some embodiments, calibration engines may be arranged to store calibration profiles to enable them to be recovered/obtained if the same or similar sensor/sensing application may be employed in the future.

Next, in one or more of the various embodiments, control may be returned to a calling process.

Figure 15:
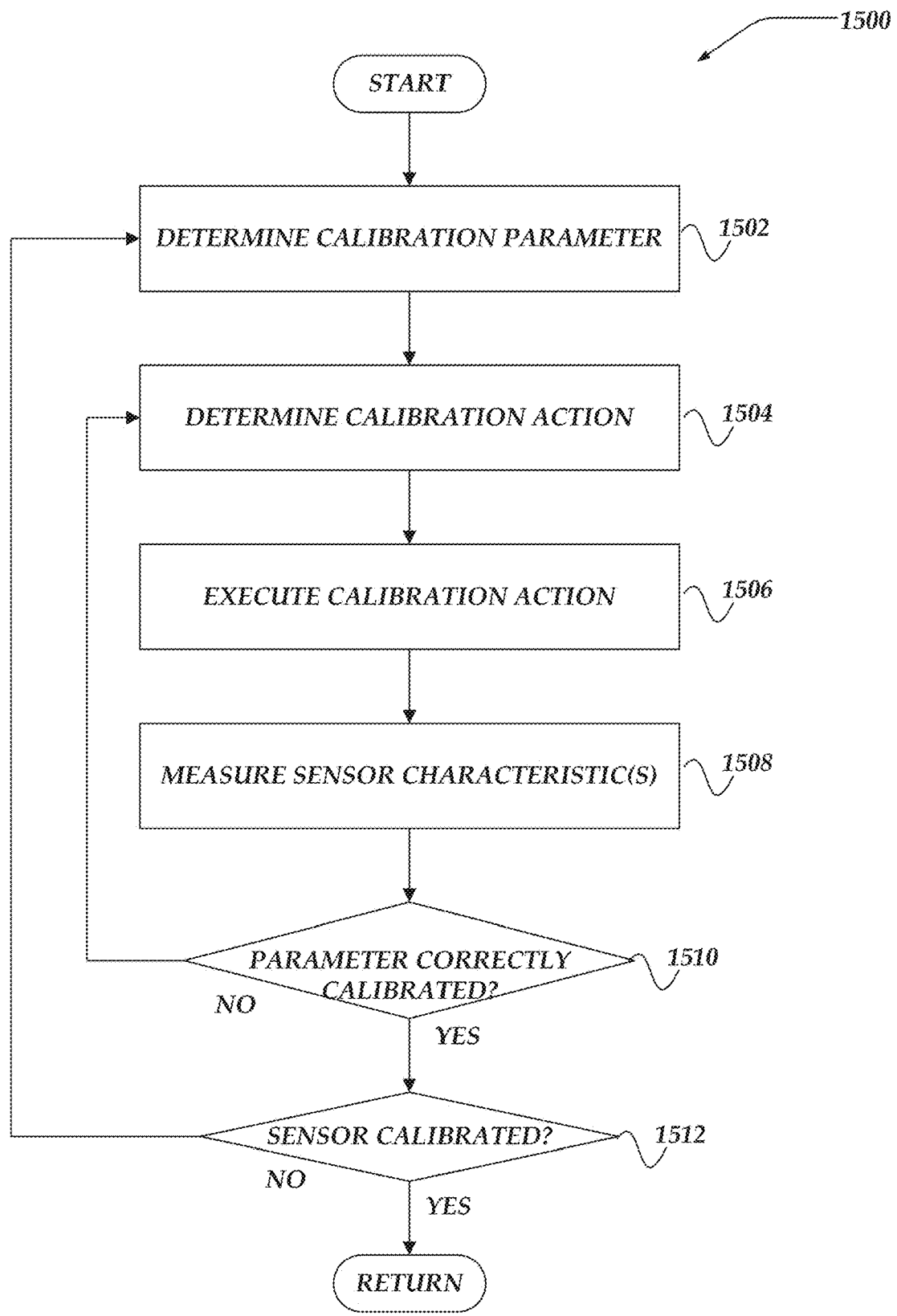
FIG. 15 illustrates a flowchart of a process for automatic parameter adjustment for scanning event cameras in accordance with one or more of the various embodiments.

FIG. 15 illustrates a flowchart of process 1500 for automatic parameter adjustment for scanning event cameras in accordance with one or more of the various embodiments. After a start block, at block 1502, in one or more of the various embodiments, calibration engines may be arranged to determine a calibration parameter. In one or more of the various embodiments, calibration models may declare one or more calibration parameters that may be acted upon. In some embodiments, different sensor types may have different calibration parameters. Accordingly, in some embodiments, the particular calibration parameters determined for calibrating may vary depending on sensor type, sensing application, operating environment, or the like.

At block 1504, in one or more of the various embodiments, calibration engines may be arranged to one or more calibration actions. As described above, calibration models may be arranged to declare one or more actions that may be executed by calibration engines. In some embodiments, the calibration model may declare the order in which calibration parameters may be evaluated. In some cases, for some embodiments, a same action may be executed to evaluate two or more calibration parameters.

In one or more of the various embodiments, calibration actions may be configured to include 'programming' constructs such as control structures, loops, temporary variables, or the like. Accordingly, in some embodiments, calibration actions may be declared using conventional programming languages. Also, in some embodiments, calibration actions may be declared using customized programming languages, visual programming tools, configuration files, or the like.

Accordingly, in some embodiments, a single calibration action may be part of a larger calibration action. For example, in some embodiments, a calibration model may declare a search function for a particular calibration parameter that comprises many sub-actions.

At block 1506, in one or more of the various embodiments, calibration engines may be arranged to execute the one or more calibration actions.

At block 1508, in one or more of the various embodiments, calibration engines may be arranged to measure one or more metrics that may be associated with the sensor characteristic. As described above, in some embodiments, calibration models may declare one or more metrics that may be measured to evaluate if a calibration parameter may be considered calibrated. In some embodiments, the particular metrics may be vary depending on the sensor type, sensing application, operating environment, application, or the like. In some embodiments, in some cases, metrics may be intrinsic to the sensor(s) while in other cases, metrics may be extrinsic to the sensor(s).

For example, in some embodiments, a calibration model may declare that cell/pixel response time may be a metric to consider for evaluating the effect of changes to a calibration parameter. Likewise, for example, another calibration model may declare that average length of scanned trajectories is the metric used to evaluating the effect of changes to a calibration parameter.

At decision block 1510, in one or more of the various embodiments, if the calibration parameter value may be correctly calibrated, control may flow decision block 1512; otherwise, control may loop back to block 1504. As described above, in some embodiments, calibration model may be configured to declare success criteria for evaluating calibration of sensor. Accordingly, in some embodiments, calibration models may include various ranges, threshold values, conditions, or the like, that may correspond to a success or acceptance criteria. Thus, in some embodiments, calibration engines may be arranged to execute one or more actions declared in a calibration model to evaluate calibration results to determine if those results indicate that a calibration parameter may be correctly calibrated.

At decision block 1512, in one or more of the various embodiments, if the sensor calibration may be completed, control may be returned to a calling process; otherwise, control may loop back to block 1502. In one or more of the various embodiments, calibration engines may be arranged to employ criteria declared in calibration models to determine if a calibration session may be considered complete. In some embodiments, calibration models may indicate a failure calibrate or other error conditions if a sensor may be determined by defective or incompatible with a given application, or the like.

Figure 16:
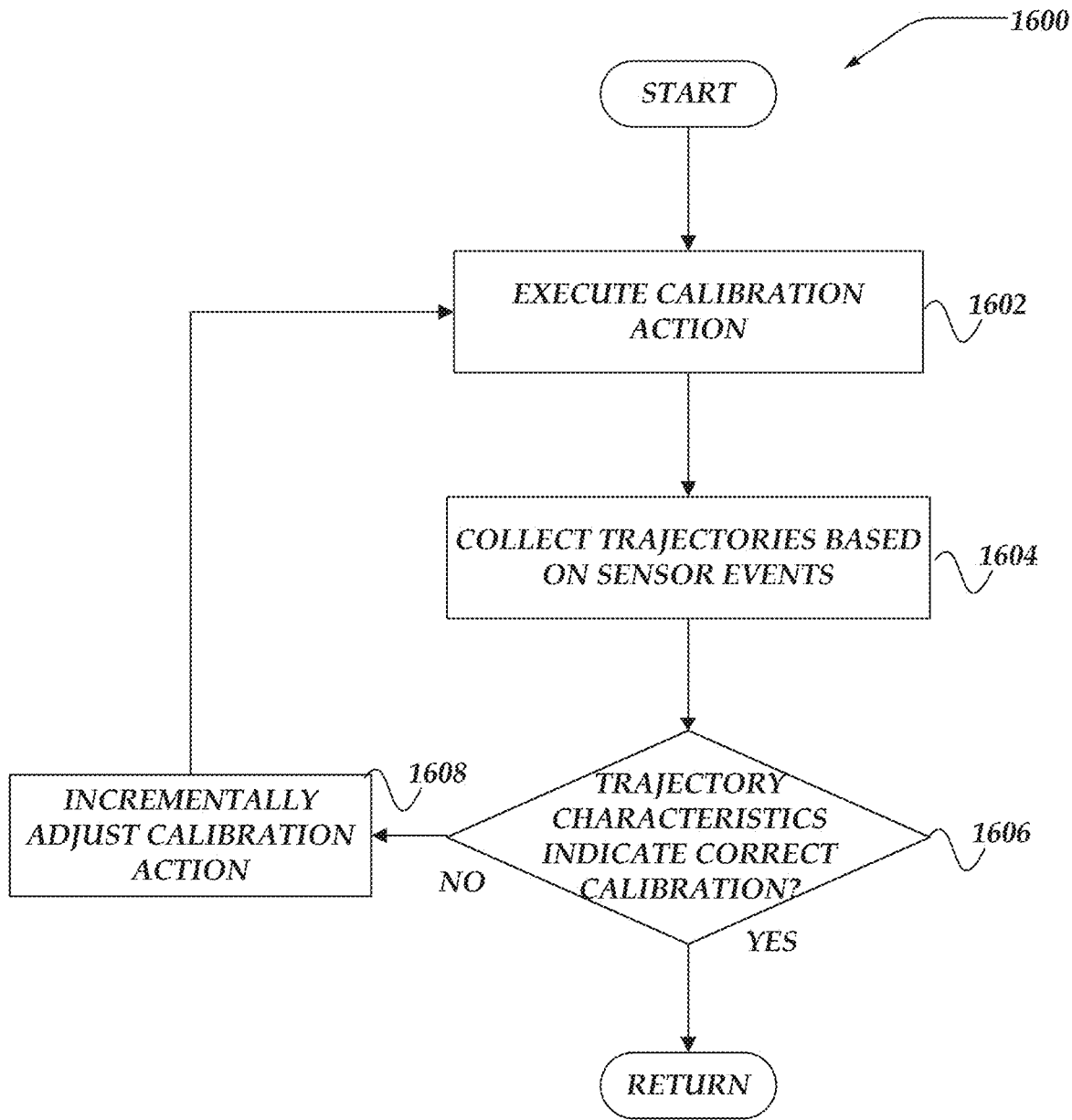
FIG. 16 illustrates a flowchart of a process for automatic parameter adjustment for scanning event cameras in accordance with one or more of the various embodiments.

FIG. 16 illustrates a flowchart of process 1600 for automatic parameter adjustment for scanning event cameras in accordance with one or more of the various embodiments. After a start block, at block 1602, in one or more of the various embodiments, calibration engines may be arranged to execute one or more calibration actions. As described above, calibration engines may be arranged to execute one or more calibration actions that may be declared in calibration models. In one or more of the various embodiments, calibration actions may include setting one or more sensor parameters then triggering a signal scan of a calibration surface. Note, in some embodiments, one of ordinary skill in the art will appreciate that there may be an many different calibration actions depending on the characteristics of the sensor, sensing system, operation environment, application requirements, or the like. Accordingly, in some embodiments, instructions, rules, libraries, plug-ins, or the like, that declare or support one or more particular calibration actions that may be declared or referenced by calibration models may be provided configuration information to account for local circumstances or local requirements.

In one or more of the various embodiments, calibration actions may be configured to include 'programming' constructs such as control structures, loops, temporary variables, or the like. Accordingly, in some embodiments, calibration actions may be declared using conventional programming languages. Also, in some embodiments, calibration actions may be declared using customized programming languages, visual programming tools, configuration files, or the like.

Accordingly, in some embodiments, a single calibration action may be part of a larger calibration action. For example, in some embodiments, a calibration model may declare a search function for a particular calibration parameter that comprises many sub-actions.

At block 1604, in one or more of the various embodiments, calibration engines may be arranged to collect one or more trajectories based on one or more sensor events. As described above, in some embodiments, calibration engines may be arranged to employ various criteria for evaluating sensor characteristics in response to calibration parameter settings. In some cases, the average length of unbroken trajectory paths determined from a signal scan of a calibration surface may be employed as a metric to evaluate calibration results.

At decision block 1606, in one or more of the various embodiments, if the trajectory characteristics may indicate that the calibration parameter may be correctly calibrated, control may be returned to a calling process; otherwise, control may flow to block 1608. In one or more of the various embodiments, calibration models may declare success criteria for various metrics that may be employed to evaluate the results of a calibration action. In some embodiments, if trajectory length is being used to evaluate a calibration change, one or more metrics associated with trajectory length may compared to one or more success conditions to determine if the sensor may be correctly calibrated. For example, in some embodiments, various metrics may include, trajectory length, change in average trajectory length, or the like. As described above, the particular conditions for determining if one or more sensors may be correctly calibrated may varying depending environmental conditions, performance/features of the sensing system, application requirements, or the like. Accordingly, in some embodiments, success condition may be declared in calibration models or provided by configuration information to account for local requirements or local circumstances.

At block 1608, in one or more of the various embodiments, calibration engines may be arranged to incrementally adjust the calibration action based on the calibration model. As described above, in some embodiments, calibration engines may be arranged to employ instructions declared in calibration models to execute a search strategy for finding an optimal value for parameters being calibrated. For example, in some embodiments, a search strategy for a particular parameter may include coordinate descent schemes that incrementally adjust parameter values to find value the minimize of maximize one or more metrics associated with the calibration parameter. Next, control may loop back to block 1602.

It will be understood that each block in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for calibrating sensors using one or more processors that are configured to execute instructions, wherein the instructions perform actions, comprising:
providing a calibration model and a calibration profile for a sensor based on one or more characteristics of the sensor;
determining one or more calibration parameters associated with the sensor based on the calibration profile;
configuring the sensor to use a value of the calibration parameter based on the calibration profile;
generating one or more trajectories based on a stream of events from the sensor, wherein each trajectory is a parametric representation of a one-dimensional curve segment in a three-dimensional space;
determining one or more metrics associated with one or more of the sensor events or the one or more trajectories; and in response to determining a metric value that indicates a calibration error, iteratively performing additional further actions, including:
    modifying the value of the calibration parameter based on the calibration model;
    configuring the sensor to use the modified value of the calibration parameter;
    redetermining the one or more metrics based on one or more additional trajectories based on another stream of events from the sensor; and
    in response to determining that the metric value indicates a correct calibration, terminating the iteration and updating the calibration profile to store the modified value for the calibration parameter.

2. The method of claim 1, wherein determining the one or more metrics, further comprises:
    determining an average length of the one or more trajectories; and
    in response to the average length of the one or more trajectories having a value that is less than a threshold value, determining that the metric value indicates the calibration error.

3. The method of claim 1, wherein the one or more calibration parameters, further comprise, one or more parameters that are intrinsic to the sensor, including one or more of a high-pass filter frequency, a low-pass filter frequency, a photodiode current gain, a voltage differential level for on-pixel level, or a voltage differential level for off-pixel levels.

4. The method of claim 1, wherein the one or more calibration parameters, further comprise, one or more parameters that are extrinsic to the sensor, including one or more of scanning signal power, a scanning signal frequency, a pixel firing rate, a change in classification of noise or signal pixels, a path or a velocity of the scanning signal, a width of a laser spot from a laser, or a camera bandpass filter for ambient light rejection.

5. The method of claim 1, wherein determining the one or more metrics, further comprises:
    determining an event rate for the stream of events based on how fast the sensor generates one or more events and a scanning velocity of a scanning signal; and
    in response to the even rate exceeding a threshold value, determining that the metric value indicates the calibration error.

6. The method of claim 1, further comprising:
    generating one or more other calibration profiles for the sensor based on one or more of an application, an operating environment, or a performance requirement; and
    associating the one or more other calibration profiles with the sensor based on one or more of the application, the operating environment, or the performance requirement.

7. The method of claim 1, further comprising:
    determining a plurality of pixels included in the sensor based on the sensor;
    determining one or more portions of the plurality of pixels based on the calibration model; and
    generating one or more other calibration profiles, wherein each other calibration profile is associated with a separate portion of the plurality of pixels.

8. The method of claim 1, wherein modifying the value of the calibration parameter, further comprises:
    determining an adjustment value to modify the value of the calibration parameter based on employ a coordinate descent method; and
    updating the value of the calibration parameter based on the determined adjustment value.

9. A network computer for calibrating sensors, comprising:
    a memory that stores at least instructions; and
    one or more processors configured to execute instructions, wherein the instructions perform actions, including:
        providing a calibration model and a calibration profile for a sensor based on one or more characteristics of the sensor;
        determining one or more calibration parameters associated with the sensor based on the calibration profile;
        configuring the sensor to use a value of the calibration parameter based on the calibration profile;
        generating one or more trajectories based on a stream of events from the sensor, wherein each trajectory is a parametric representation of a one-dimensional curve segment in a three-dimensional space;
        determining one or more metrics associated with one or more of the sensor events or the one or more trajectories; and
        in response to determining a metric value that indicates a calibration error, iteratively performing additional further actions, including:
            modifying the value of the calibration parameter based on the calibration model;
            configuring the sensor to use the modified value of the calibration parameter;
            redetermining the one or more metrics based on one or more additional trajectories based on another stream of events from the sensor; and
            in response to determining that the metric value indicates a correct calibration, terminating the iteration and updating the calibration profile to store the modified value for the calibration parameter.

10. The network computer of claim 9, wherein determining the one or more metrics, further comprises:
    determining an average length of the one or more trajectories; and
    in response to the average length of the one or more trajectories having a value that is less than a threshold value, determining that the metric value indicates the calibration error.

11. The network computer of claim 9, wherein the one or more calibration parameters, further comprise, one or more parameters that are intrinsic to the sensor, including one or more of a high-pass filter frequency, a low-pass filter frequency, a photodiode current gain, a voltage differential level for on-pixel level, or a voltage differential level for off-pixel levels.

12. The network computer of claim 9, wherein the one or more calibration parameters, further comprise, one or more parameters that are extrinsic to the sensor, including one or more of scanning signal power, a scanning signal frequency, a pixel firing rate, a change in classification of noise or signal pixels, a path or a velocity of the scanning signal, a width of a laser spot from a laser, or a camera bandpass filter for ambient light rejection.

13. The network computer of claim 9, wherein determining the one or more metrics, further comprises:
    determining an event rate for the stream of events based on how fast the sensor generates one or more events and a scanning velocity of a scanning signal; and in response to the even rate exceeding a threshold value, determining that the metric value indicates the calibration error.

14. The network computer of claim 9, wherein the one or more processors are configured to execute instructions, wherein the instructions perform actions further comprising:
generating one or more other calibration profiles for the sensor based on one or more of an application, an operating environment, or a performance requirement; and
associating the one or more other calibration profiles with the sensor based on one or more of the application, the operating environment, or the performance requirement.

15. The network computer of claim 9, wherein the one or more processors are configured to execute instructions, wherein the instructions perform actions further comprising:
determining a plurality of pixels included in the sensor based on the sensor;
determining one or more portions of the plurality of pixels based on the calibration model; and
generating one or more other calibration profiles, wherein each other calibration profile is associated with a separate portion of the plurality of pixels.

16. The network computer of claim 9, wherein modifying the value of the calibration parameter, further comprises:
determining an adjustment value to modify the value of the calibration parameter based on employ a coordinate descent method; and
updating the value of the calibration parameter based on the determined adjustment value.

17. A processor readable non-transitory storage media that includes instructions for calibrating sensors, wherein execution of the instructions by one or more processors on one or more network computers performs actions, comprising:
providing a calibration model and a calibration profile for a sensor based on one or more characteristics of the sensor;
determining one or more calibration parameters associated with the sensor based on the calibration profile;
configuring the sensor to use a value of the calibration parameter based on the calibration profile;
generating one or more trajectories based on a stream of events from the sensor, wherein each trajectory is a parametric representation of a one-dimensional curve segment in a three-dimensional space;
determining one or more metrics associated with one or more of the sensor events or the one or more trajectories; and
in response to determining a metric value that indicates a calibration error, iteratively performing additional further actions, including:
modifying the value of the calibration parameter based on the calibration model;
configuring the sensor to use the modified value of the calibration parameter;
redetermining the one or more metrics based on one or more additional trajectories based on another stream of events from the sensor; and
in response to determining that the metric value indicates a correct calibration, terminating the iteration and updating the calibration profile to store the modified value for the calibration parameter.

18. The media of claim 17, wherein determining the one or more metrics, further comprises:
determining an average length of the one or more trajectories; and
in response to the average length of the one or more trajectories having a value that is less than a threshold value, determining that the metric value indicates the calibration error.

19. The media of claim 17, wherein the one or more calibration parameters, further comprise, one or more parameters that are intrinsic to the sensor, including one or more of a high-pass filter frequency, a low-pass filter frequency, a photodiode current gain, a voltage differential level for on-pixel level, or a voltage differential level for off-pixel levels.

20. The media of claim 17, wherein the one or more calibration parameters, further comprise, one or more parameters that are extrinsic to the sensor, including one or more of scanning signal power, a scanning signal frequency, a pixel firing rate, a change in classification of noise or signal pixels, a path or a velocity of the scanning signal, a width of a laser spot from a laser, or a camera bandpass filter for ambient light rejection.

21. The media of claim 17, wherein determining the one or more metrics, further comprises:
determining an event rate for the stream of events based on how fast the sensor generates one or more events and a scanning velocity of a scanning signal; and
in response to the even rate exceeding a threshold value, determining that the metric value indicates the calibration error.

22. The media of claim 17, further comprising:
generating one or more other calibration profiles for the sensor based on one or more of an application, an operating environment, or a performance requirement; and
associating the one or more other calibration profiles with the sensor based on one or more of the application, the operating environment, or the performance requirement.

23. The media of claim 17, further comprising:
determining a plurality of pixels included in the sensor based on the sensor;
determining one or more portions of the plurality of pixels based on the calibration model; and
generating one or more other calibration profiles, wherein each other calibration profile is associated with a separate portion of the plurality of pixels.

24. The media of claim 17, wherein modifying the value of the calibration parameter, further comprises:
determining an adjustment value to modify the value of the calibration parameter based on employ a coordinate descent method; and
updating the value of the calibration parameter based on the determined adjustment value.

25. A system for calibrating sensors:
a network computer, comprising:
a memory that stores at least instructions; and
one or more processors configured to execute instructions, wherein the instructions perform actions, including:
providing a calibration model and a calibration profile for a sensor based on one or more characteristics of the sensor;
determining one or more calibration parameters associated with the sensor based on the calibration profile;
configuring the sensor to use a value of the calibration parameter based on the calibration profile;
generating one or more trajectories based on a stream of events from the sensor, wherein each trajectory is a parametric representation of a one-dimensional curve segment in a three-dimensional space;

determining one or more metrics associated with one or more of the sensor events or the one or more trajectories; and in response to determining a metric value that indicates a calibration error, iteratively performing additional further actions, including:

modifying the value of the calibration parameter based on the calibration model;

configuring the sensor to use the modified value of the calibration parameter;

redetermining the one or more metrics based on one or more additional trajectories based on another stream of events from the sensor; and in response to determining that the metric value indicates a correct calibration, terminating the iteration and updating the calibration profile to store the modified value for the calibration parameter; and one or more client computers, comprising:

a memory that stores at least instructions; and one or more processors configured to execute instructions, wherein the instructions perform actions, including, providing one or more portions of the sensor events.

26. The system of claim 25, wherein determining the one or more metrics, further comprises:

determining an average length of the one or more trajectories; and in response to the average length of the one or more trajectories having a value that is less than a threshold value, determining that the metric value indicates a calibration error.

27. The system of claim 25, wherein the one or more calibration parameters, further comprise, one or more parameters that are intrinsic to the sensor, including one or more of a high-pass filter frequency, a low-pass filter frequency, a photodiode current gain, a voltage differential level for on-pixel level, or a voltage differential level for off-pixel levels.

28. The system of claim 25, wherein the one or more calibration parameters, further comprise, one or more parameters that are extrinsic to the sensor, including one or more of scanning signal power, a scanning signal frequency, a pixel firing rate, a change in classification of noise or signal pixels, a path or a velocity of the scanning signal, a width of a laser spot from a laser, or a camera bandpass filter for ambient light rejection.

29. The system of claim 25, wherein determining the one or more metrics, further comprises:

determining an event rate for the stream of events based on how fast the sensor generates one or more events and a scanning velocity of a scanning signal; and in response to the even rate exceeding a threshold value, determining that the metric value indicates a calibration error.

30. The system of claim 25, wherein the one or more processors of the network computer are configured to execute instructions, wherein the instructions perform actions further comprising:

generating one or more other calibration profiles for the sensor based on one or more of an application, an operating environment, or a performance requirement; and associating the one or more other calibration profiles with the sensor based on one or more of the application, the operating environment, or the performance requirement.

31. The system of claim 25, wherein the one or more processors of the network computer are configured to execute instructions, wherein the instructions perform actions further comprising:

determining a plurality of pixels included in the sensor based on the sensor;

determining one or more portions of the plurality of pixels based on the calibration model; and generating one or more other calibration profiles, wherein each other calibration profile is associated with a separate portion of the plurality of pixels.

32. The system of claim 25, wherein modifying the value of the calibration parameter, further comprises:

determining an adjustment value to modify the value of the calibration parameter based on employ a coordinate descent method; and updating the value of the calibration parameter based on the determined adjustment value.

* * * * *

UNITED STATES PATENT AND TRADEMARK OFFICE
CERTIFICATE OF CORRECTION

PATENT NO. : 12,148,185 B2
APPLICATION NO. : 17/865794
DATED : November 19, 2024
INVENTOR(S) : Cullen et al.

Page 1 of 1

It is certified that error appears in the above-identified patent and that said Letters Patent is hereby corrected as shown below:

In the Claims

In Column 37, Line 66, in Claim 8, delete "employ" and insert -- employing --, therefor.

In Column 39, Line 28, in Claim 16, delete "employ" and insert -- employing --, therefor.

In Column 40, Line 49, in Claim 24, delete "employ" and insert -- employing --, therefor.

In Column 42, Line 40, in Claim 32, delete "employ" and insert -- employing --, therefor.

Signed and Sealed this
Thirteenth Day of May, 2025

Coke Morgan Stewart
*Acting Director of the United States Patent and Trademark Office*